United States Patent [19]

Kiko

[11] Patent Number: 5,202,919
[45] Date of Patent: Apr. 13, 1993

[54] METALLIC CHANNEL UNIT NETWORK

[75] Inventor: Frederick J. Kiko, Carlsbad, Calif.

[73] Assignee: Tollgrade Communications, Inc., Pittsburgh, Pa.

[21] Appl. No.: 577,284

[22] Filed: Sep. 4, 1990

[51] Int. Cl.⁵ .......................................... H04M 19/08
[52] U.S. Cl. ..................................... 379/399; 379/344; 379/338; 379/398; 379/402; 379/404; 379/413
[58] Field of Search ............... 379/324, 338, 339, 340, 379/341, 344, 345, 348, 398, 399, 400, 401, 402, 403, 404, 405, 406, 412, 413; 370/53, 57, 58, 63, 64, 71, 69.1, 124, 75, 77, 100, 105, 101, 112, 119

[56] References Cited

U.S. PATENT DOCUMENTS

| | | | |
|---|---|---|---|
| 4,287,393 | 9/1981 | Reuvekamp | 379/413 |
| 4,476,350 | 10/1984 | Aull et al. | 379/413 |
| 4,636,584 | 1/1987 | Binkerd et al. | 370/110.1 |
| 4,677,669 | 6/1987 | Kawami et al. | 379/413 |
| 4,764,956 | 8/1988 | Rosch et al. | 379/413 |
| 4,852,160 | 7/1989 | Kiko et al. | 379/399 |
| 4,914,693 | 4/1990 | Beck et al. | 379/413 |
| 4,922,531 | 5/1990 | Moisin | 379/413 |
| 4,982,422 | 1/1991 | Itoh et al. | 379/413 |

*Primary Examiner*—James L. Dwyer
*Assistant Examiner*—M. Shehata
*Attorney, Agent, or Firm*—Davis Chin

[57] ABSTRACT

A metallic channel unit network for interconnecting a two-wire, bidirectional signal transmitting means and a four-wire signal transmitting means in a communication system includes a voice hybrid driver, A/D signal processing circuit, D/A signal processing circuit, tip and ring switching drivers, and tip and ring sensing amplifiers. The metallic channel unit network is suitable for use with substantially all of the different alarm-signalling techniques utilized by the various alarm companies for connecting their equipment to a channel bank multiplexer coupled to the four-wire means. The metallic channel unit network provides an apparent metallic cable pair over the digital carrier in the frequency range of DC to 3.5 KHz with an amplitude variation between +200 to −200 VDC.

18 Claims, 11 Drawing Sheets

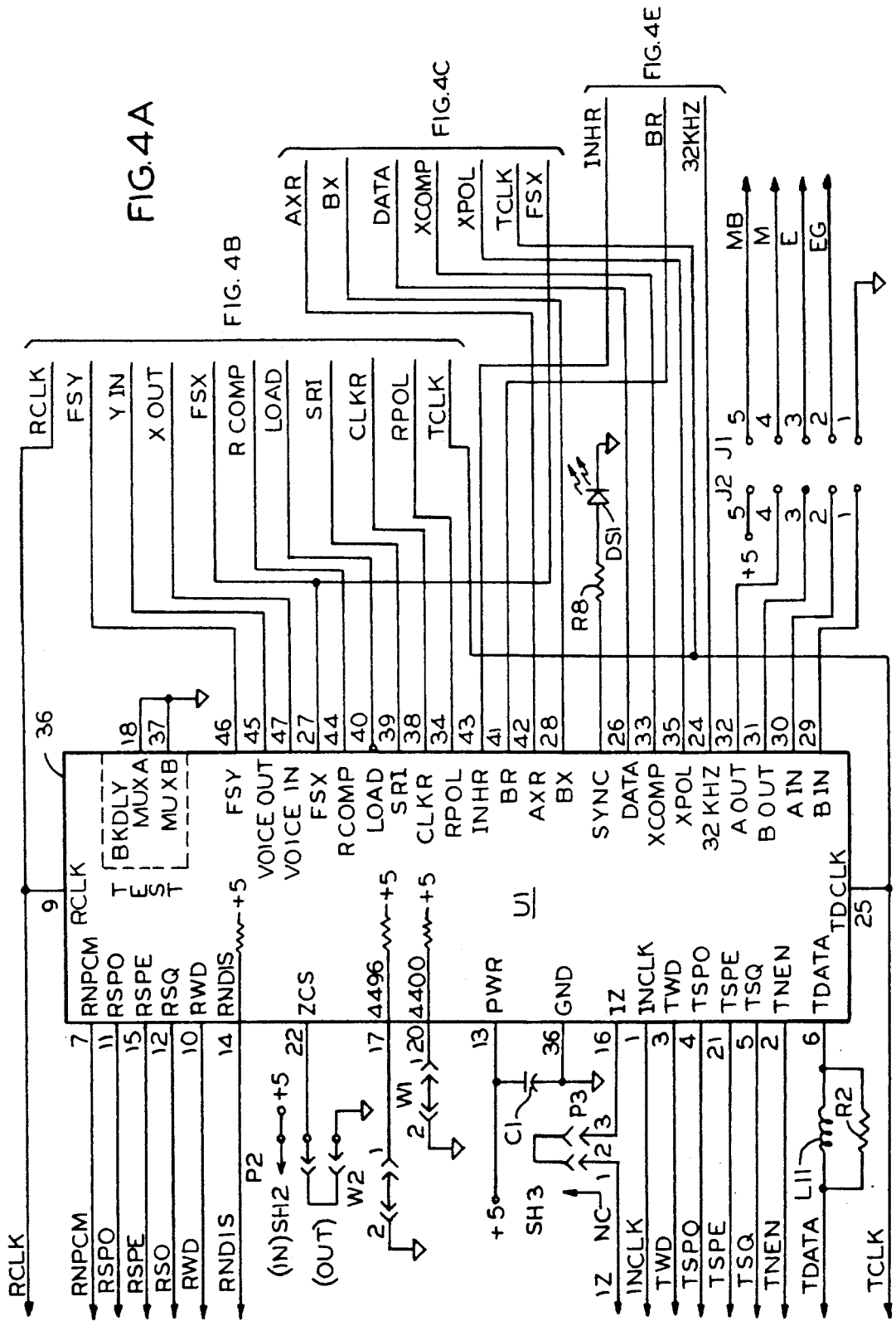

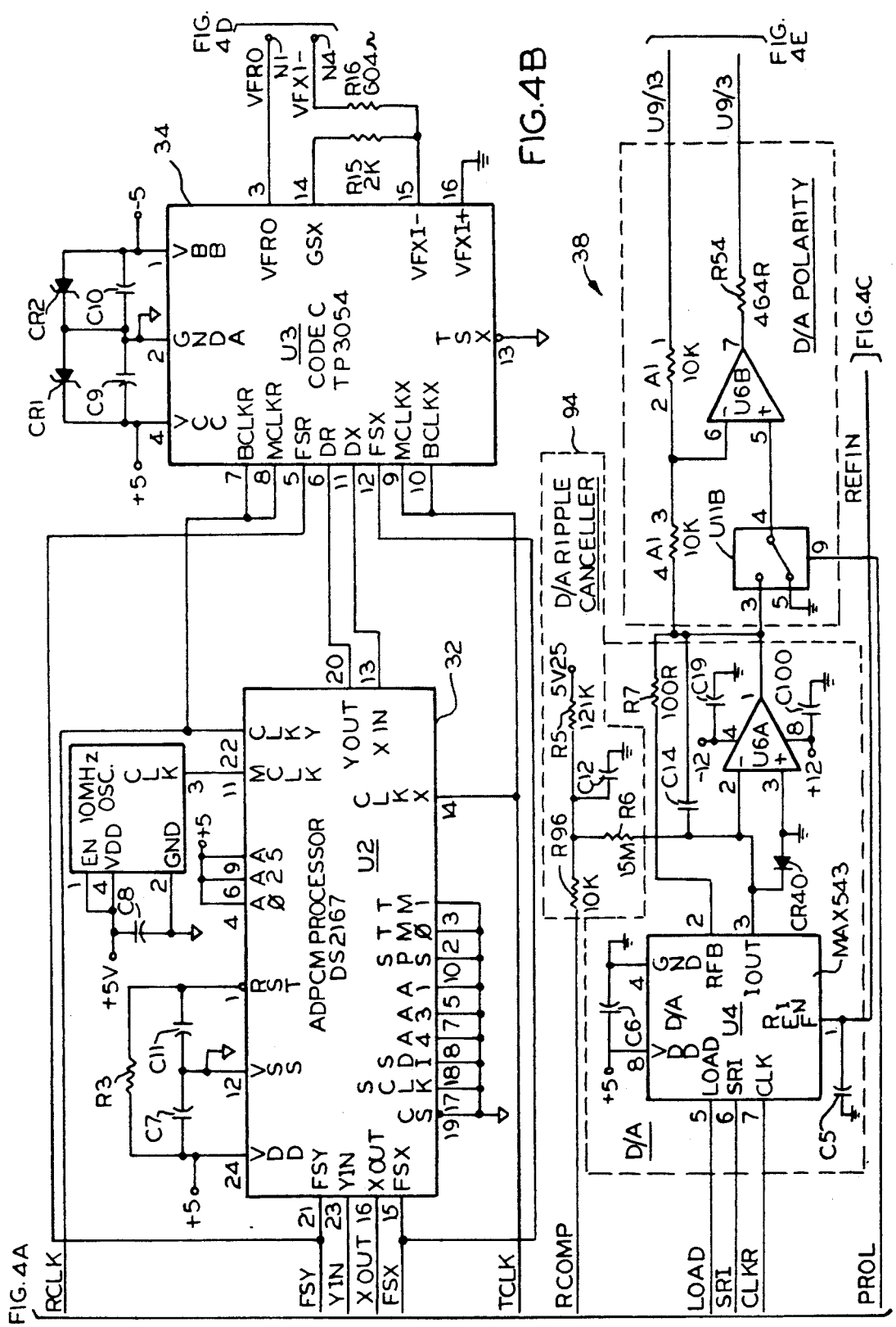

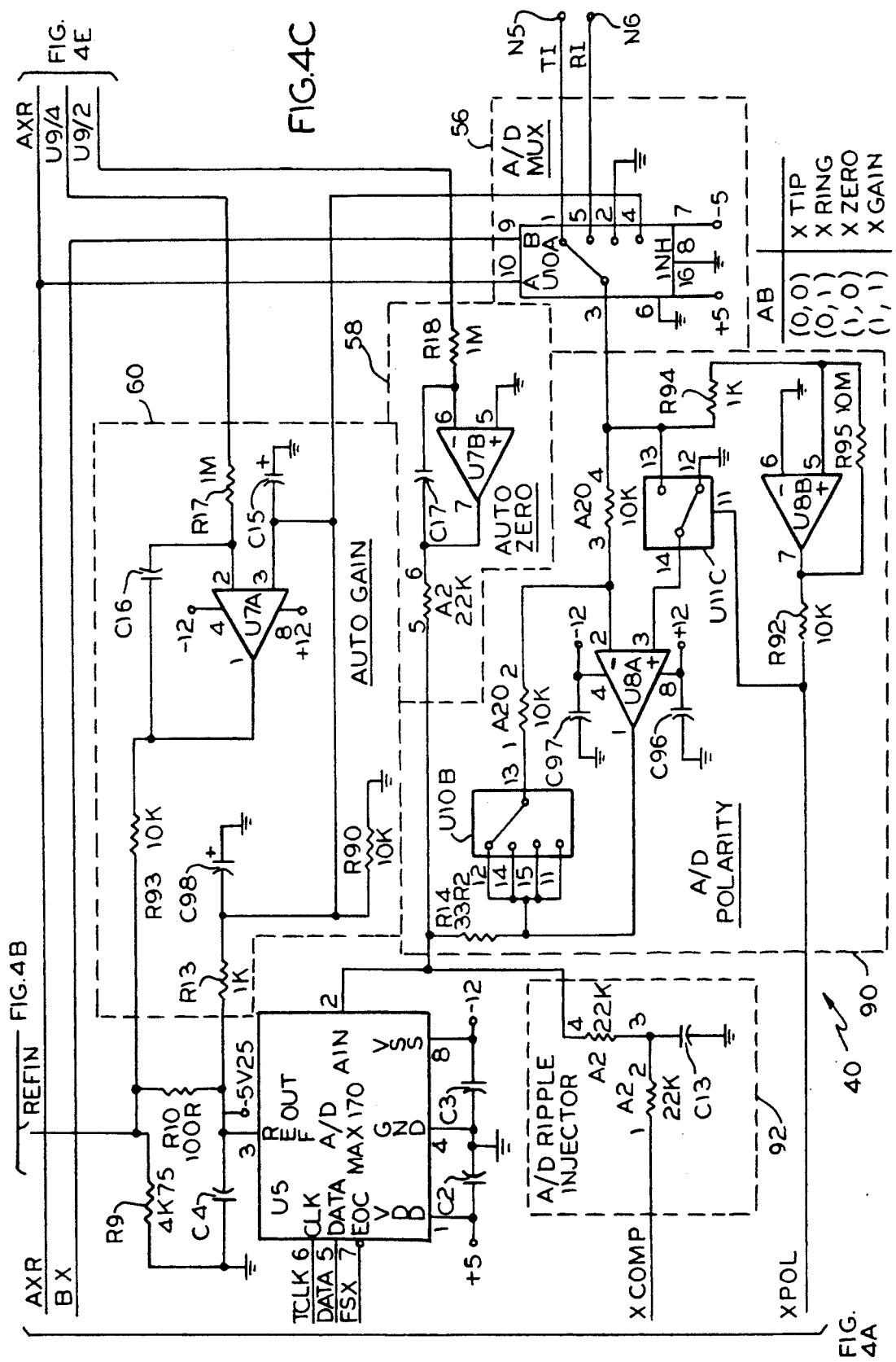

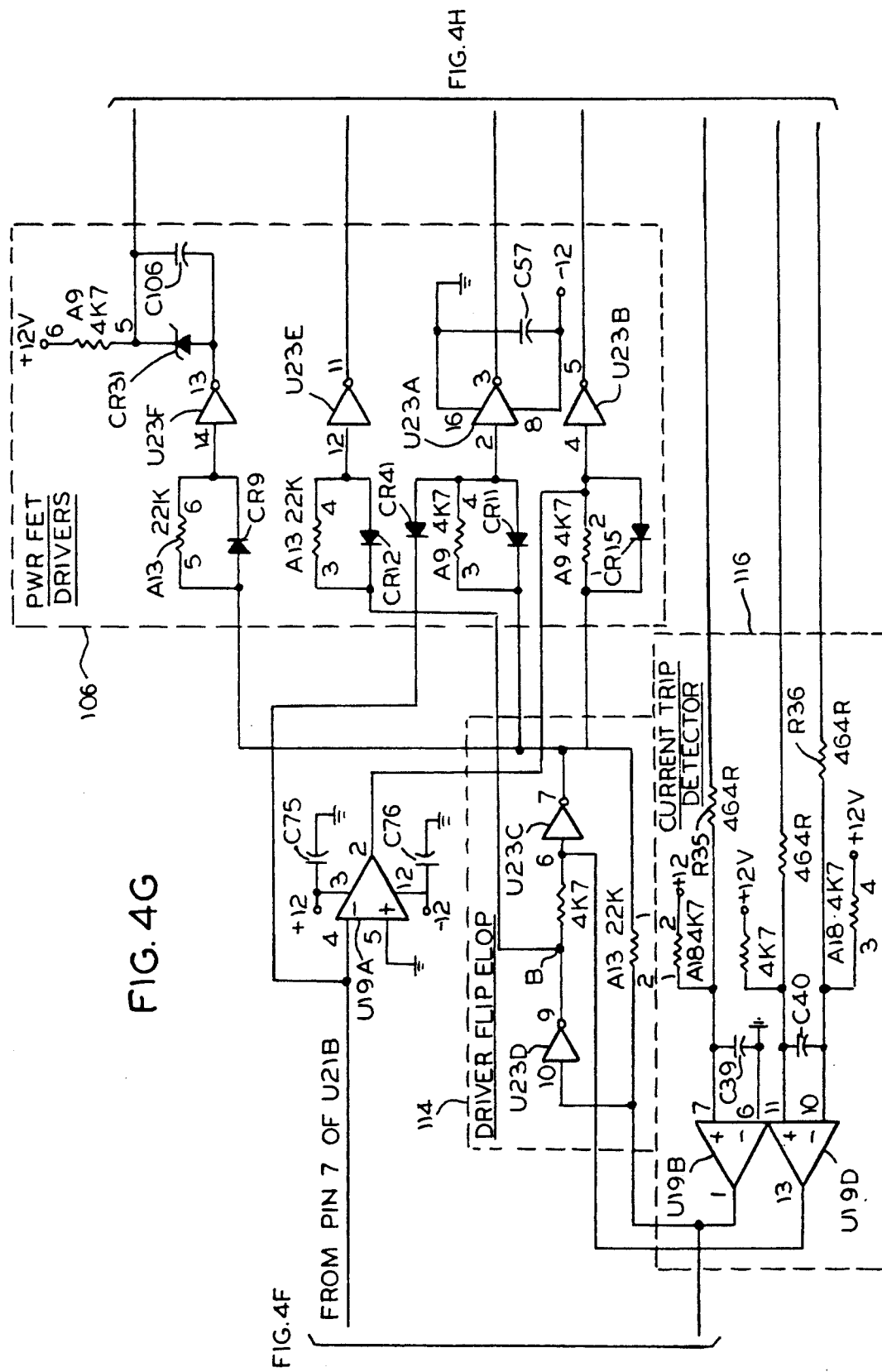

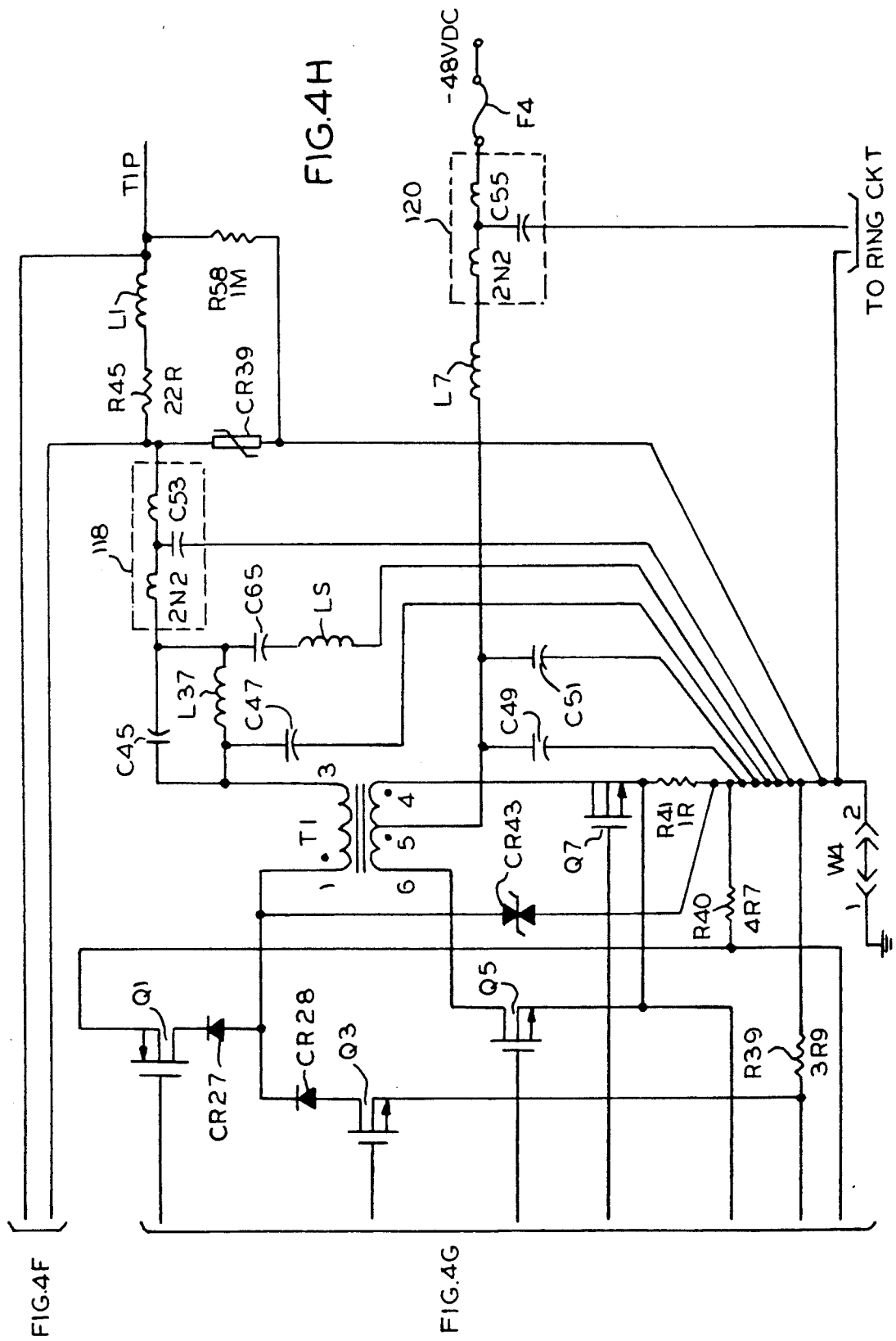

METALLIC CHANNEL UNIT NETWORK

BACKGROUND OF THE INVENTION

1. Field of the Invention:

This invention relates generally to communication systems and more particularly, it relates to metallic channel unit network for interconnecting a two-wire transmission path to a four-wire transmission path. In particular, the present invention is directed to a metallic channel unit network which is used in direct current (DC), low frequency, and voice frequency applications for interfacing between a channel bank multiplexer having a four-wire circuit and a customer station having a two-wire circuit.

2. Description of the Prior Art:

As is generally well known, burglar and fire alarm companies have leased or rented two-wire transmission lines from telephone companies so as to communicate alarm signals from their alarm-detection equipment located at a customer's premise to alarm-monitoring equipment located in their remote monitoring office. Further, test signals may be sent from the alarm-monitoring equipment over the transmission lines to the alarm-detection equipment so as to check for routine maintenance or even troubleshooting. These two-wire transmission lines are generally a part of the same wire pairs in a large multiconductor metallic cable furnished by the telephone companies over the past many years. Recently, the telephone companies have been pulling out these metallic cables and replacing them with a fibre optics transmission medium suitable for a digital carrier system so as to realize multifold orders of magnitude more circuits over a single cable, thereby reducing costs.

Unfortunately, the alarm signals generated by the burglar and fire alarm companies cannot be conveniently converted over to the digital carrier system. This is due to the fact that there are different alarm-signalling techniques and each would require a specially-designed channel unit in order to be compatible with the digital carrier system. While the telephone companies could design special equipment for use with each of the different alarm techniques, this is generally undesirable since it would be quite complex for administration as well as being relative high in cost.

In U.S. Pat. No. 4,852,160 to Frederick J. Kiko et al. issued on Jul. 25, 1989, there is disclosed a channel unit interface circuit for interconnecting a two-wire, bidirectional signal transmitting means and a four-wire transmitting means in a communication system which is suitable for use with substantially all of the different alarm-signalling techniques utilized by the various alarm companies for connecting their equipment to a channel bank coupled to the four-wire means. The interface circuit of the '160 patent simulates a transmission line or cable over a digital carrier system in the frequency range of DC to 3.5 KHz with an amplitude variation between +110 to −200 VDC. However, this patented interface circuit suffers from the disadvantages of having a large signalling capacitance and thus a slow speed of operation.

Accordingly, it would therefore be desirable to provide a metallic channel unit network for interconnecting a two-wire transmission path over a four-wire transmission path, with a relatively low signalling capacitance, a faster speed of operation, low power dissipation, and low power consumption. The present invention represents a significant improvement over the aforementioned U.S. Pat. No. 4,852,160, which is hereby incorporated by reference.

SUMMARY OF THE INVENTION

Accordingly, it is a general object of the present invention to provide a metallic channel unit network for interconnecting a two-wire transmission path to a four-wire digital transmission path which is compatible with substantially all of the different alarm techniques utilized in signalling alarm conditions.

It is an object of the present invention to provide a metallic channel unit network which produces an apparent metallic cable pair in the frequency range of DC to 3.5 KHz with an amplitude between +200 to −200 VDC.

It is another object of the present invention to provide a metallic channel unit network which includes tip and ring switching drivers each having a low output impedance formed of a series resistance and inductance so as to effect a low signalling capacitance.

It is still another object of the present invention to provide a metallic channel unit network which includes autozero and autogain means interconnected between D/A signal processing means and A/D signal processing means for automatically correcting errors occurring in the D/A conversion process of the D/A processing means.

It is yet still another object of the present invention to provide a metallic channel unit network for interconnecting a two-wire transmission path to a four-wire transmission path which has a relatively low signalling capacitance, a faster speed of operation, low power dissipation and low power consumption.

In accordance with these aims and objectives, the present invention is concerned with the provision of a metallic channel unit network for interconnecting a two-wire, bidirectional signal transmitting means and a four-wire signal transmitting and receiving means in a digital carrier system. The metallic channel unit network includes a two-wire port having tip and ring terminals which are adapted for connection to the two-wire, bidirectional signal transmitting means. There is provided a signal receive-in port which is adapted for connection to a first signal transmission path of the four-wire means for receiving incoming encoded DC to 300 Hz (DC band) frequency signals and 300 Hz to 3.5 KHz (voice band) frequency signals. A signal transmit port is adapted for connection to a second signal transmission path of the four-wire means for supplying outgoing encoded "DC band" frequency signals and "voice band" frequency signals thereto. First circuit means formed of a voice compression means and CODEC means coupled to the four-wire means for supplying the incoming tip and ring terminal "voice band" frequency signals of the four-wire means at a first node connected to the CODEC means. Second circuit means formed of D/A signal processing means and A/D signal processing means are coupled to the four-wire means for supplying the incoming tip and ring terminal "DC band" frequency signals of four-wire means at second and third nodes connected to the D/A signal processing means.

A voice hybrid driver is responsive to the incoming tip and ring terminal "voice band" frequency signals of the four-wire means at the first node from the CODEC means for applying to the respective tip and ring terminals corresponding outgoing tip and ring terminal "voice band" frequency signals. The voice hybrid driver includes a line amplifier having its inputs coupled across the tip and ring terminals and is responsive to incoming differential "voice band" frequency signals from the two-wire means for generating an output voltage on its output. The CODEC means of the first circuit means is responsive to the output voltage of line amplifier at a fourth node for supplying the outgoing tip and ring terminal "voice band" frequency signals of the two-wire means for transmission over the second path of the four-wire means.

A tip switching driver is responsive to the incoming tip terminal "DC band" frequency signals of the four-wire means arriving at the second node from the D/A signal processing means for applying to the tip terminal corresponding outgoing tip terminal "DC band" frequency signals. A ring switching driver is responsive to the incoming ring terminal "DC band" frequency signals of the four-wire means arriving at the third node from the D/A signal processing means for applying to the ring terminal corresponding outgoing ring terminal "DC band" frequency signals. A tip sensing amplifier is coupled to the tip terminal for receiving incoming tip terminal "DC band" frequency signals from the two-wire means. A ring sensing amplifier is coupled to the ring terminal for receiving incoming ring terminal "DC band" frequency signals from the two-wire means.

The A/D signal processing means is coupled to the tip sensing amplifier at a fifth node for supplying the incoming tip terminal "DC band" frequency signals of the two-wire means for transmission over the second path of the four-wire means. The A/D signal processing means is coupled to the ring sensing amplifier at a sixth node for supplying the incoming ring terminal "DC band" frequency signals of the two-wire means for transmission over the second path of the four-wire means.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 3 is an approximate equivalent circuit of the effective DC impedance of a cable pair interconnected between the metallic channel unit networks 20, 20a of the present invention;

FIGS. 4A through 4H, when connected together, is a detailed schematic circuit diagram of the metallic channel unit network constructed in accordance with the principles of the present invention.

DESCRIPTION OF THE PREFERRED EMBODIMENT

Figure 1:
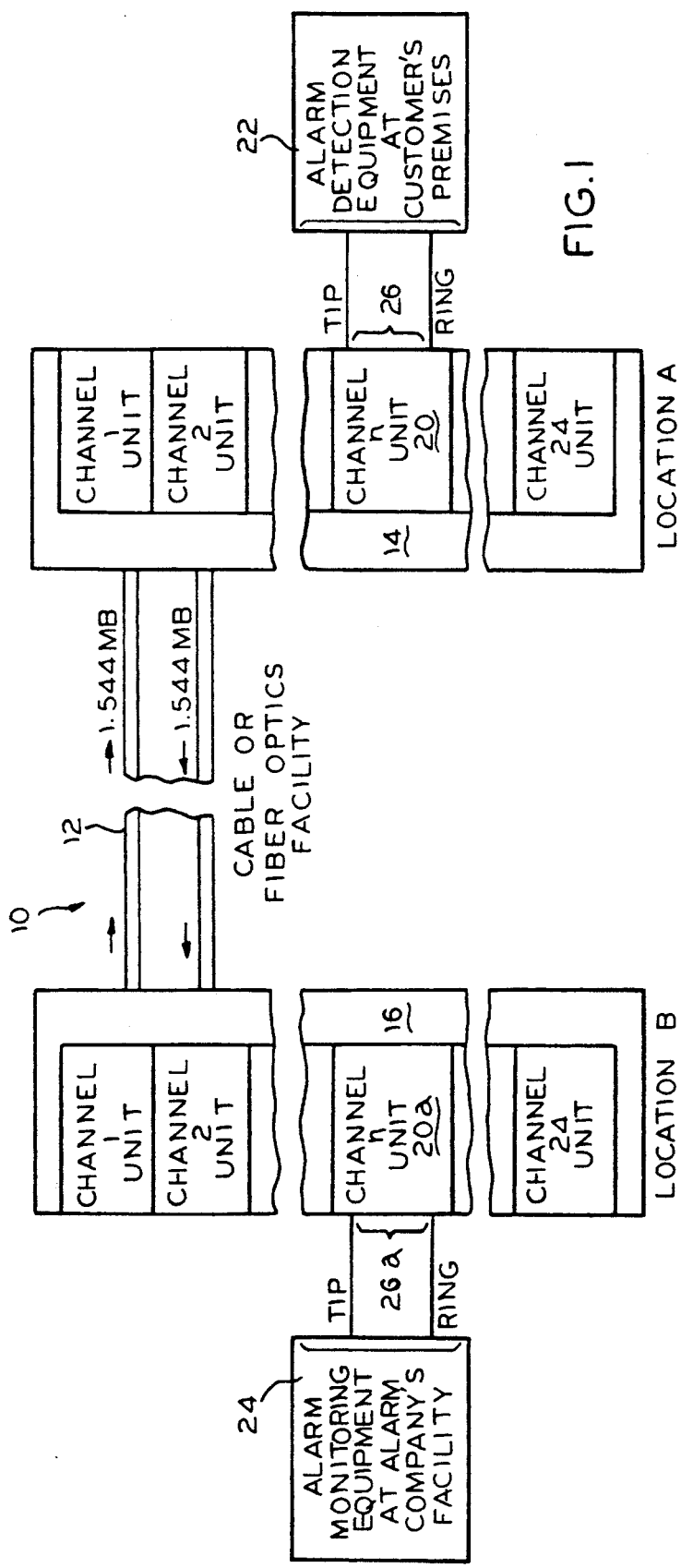
FIG. 1 is a general block diagram of a communication system which utilizes metallic channel unit networks constructed in accordance with the principles of the present invention.

Referring now in detail to the drawings, there is shown in FIG. 1 a general block diagram of a communication system 10 which incorporates metallic channel unit networks constructed in accordance with the principles of the present invention. The communication system 10 includes transmission lines 12 which are interconnected between a first channel bank multiplexer 14 disposed at a first central office or location A and a second channel bank multiplexer 16 disposed at a second central office or location B. The transmission lines 12 are typically in the form of a cable or fibre optics transmission medium suitable for a digital carrier system. Each of the channel bank multiplexers 14 and 16 may typically accommodate up to twenty-four metallic channel unit networks. The metallic channel unit network 20 refers to a metallic channel unit network of the present invention in the channel bank 14 and is connected between the channel bank 14 and the alarm-detection equipment 22 located at a customer's premise. The alarm-detection equipment 22 generates signals indicative of alarm conditions which are to be monitored by an alarm company. The metallic channel unit network 20a refers to a metallic channel unit network of the present invention in the channel bank multiplexer 16 and is connected between the channel bank multiplexer 16 and the alarm-monitoring equipment 24 in a monitoring facility of the alarm company. Since the metallic channel unit networks 20 and 20a are identical in construction, it will be only necessary to describe the components and operation of one of them.

Figure 2:
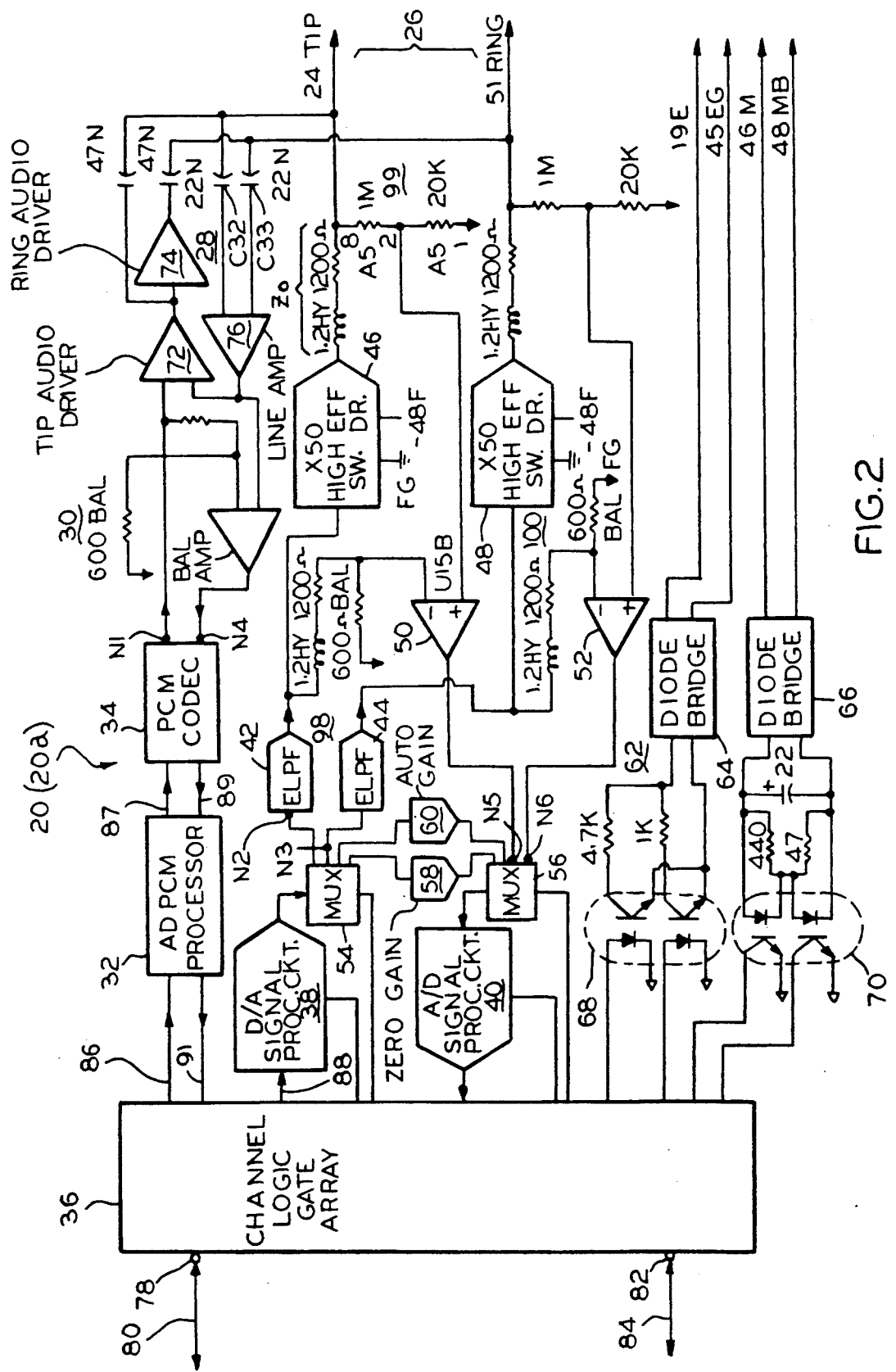
FIG. 2 is a simplified block diagram of a metallic channel unit of the present invention.

There is illustrated in FIG. 2 a simplified block diagram of the metallic channel unit network 20 or 20a of FIG. 1 which is connected at each end of the cable 12 via the respective channel bank multiplexers 14 and 16. The metallic channel unit network 20 has a bidirectional port 26 formed by a tip terminal and a ring terminal. The ring and tip terminals of the metallic channel unit network 20 are connected to the alarm-detection equipment 22, and the ring and tip terminals at the bidirectional port 26a of the metallic channel unit network 20a are connected to the alarm-monitoring equipment 24.

The metallic channel unit network 20 at location A (FIG. 2) includes a voice hybrid driver 28, with a reference/balance circuit 30, an ADPCM (an acronym for adaptive delta pulse code modulation) processor 32, a voice PCM/CODEC 34 (coder/decoder), a channel logic gate array 36, a D/A signal processing circuit 38, an A/D signal processing circuit 40, a tip filter network 42, a ring filter network 44, a X50 high efficiency tip switching driver 46, and a X50 high efficiency ring switching driver 48. A voltage divider 99 is connected between the tip terminal and a ground potential to provide a 50-to-1 attenuation/gain ratio for scaling down the $\pm 200$ tip terminal voltage to be compatible with the A/D and D/A signal processing circuits. Further, the metallic channel unit network 20 includes a tip sense amplifier 50, a ring sense amplifier 52, a first multiplexer 54 associated with the D/A processing circuit 38, a second multiplexer 56 associated with the A/D 10 processing circuit 40, an autozero circuit 58, and an autogain loop circuit 60. Optionally, the metallic channel unit network may further include a sleeve lead control circuit 62 for sensing a low impedance or high impedance source. The control circuit 62 is comprised of a pair of diode bridges 64, 66 and a pair of optocouplers 68, 70 which are used to send sensed information to the channel logic gate array 36. The voice hybrid driver 28 is formed of a tip audio driver 72, a ring audio driver 74, and a line amplifier driver 76. For the purpose of creating an apparent metallic pair connection over the digital carrier system between the tip and ring terminals at location A and the tip and ring terminals at location B, the metallic channel unit 20 separates the frequency range into two bands consisting of: (1) a DC band or channel having a frequency range of DC to approximately 300 Hz, and (2) a voice band or channel having a frequency range between 300 to 3.5 KHz.

Since the circuit design of the metallic channel unit network 20a is the same as that of the metallic channel unit network 20, like reference characters have been applied to designate like components or parts except the components of the metallic channel unit network 20a have been suffixed by a letter "a" to distinguish them from the reference numerals used to identify the components of the metallic channel unit network 20.

For the "voice band or channel" operation, incoming differential signals (such as those originating at the alarm-detection equipment connected to location A) arriving at the bidirectional port 26 are converted by the line amplifier driver 76 of the voice hybrid driver 28 to unbalanced or single-ended signals for transmission to the PCM/CODEC 34. The CODEC sends this "voice band" information over to the channel bank multiplexer 14 via the ADPCM processor 32 and the channel logic gate array 36. This "voice band" information is then received at the CODEC 34a via the cable 12, the channel bank multiplexer 16, the channel logic gate array 36a at location B, and the ADPCM processor 32a. Finally, the tip audio driver 72a and the ring audio driver 74a are used to convert the unbalanced signals back to balanced (differential) signals for transmission out the tip and ring terminals (bidirectional port 26a) which are connected to the alarm-monitoring equipment at location B.

In the "DC band or channel" operation, incoming "DC band" frequency signals (those originating at the alarm-detection equipment connected to location A) arriving at the bidirectional port 26 are blocked by the capacitors C32 and C33 and are thus not converted by the line amplifier driver 76, but are transmitted separately via the tip and ring sense amplifiers 50, 52, A/D signal processing circuit 40, and the gate array 36. This "DC band" information is received at the D/C signal processing circuit 38a via the cable 12, the channel bank multiplexer 16, and the gate array 36a. The tip and ring switching drivers 46a and 48a are used to send this "DC band" information from the D/A processing circuit 38a to the bidirectional port 26a which are connected to the alarm-monitoring equipment at location B.

The "DC band" input current signal at the tip terminal is initially determined by the input impedance of 1200 ohms + 1.2 Hy. This input current signal applies an input voltage at location A which is also sent via the carrier facility to the identical metallic channel unit network at location B. In the case where location B is open circuited, the signal will be reflected and sent back to location A and will result in the input impedance at location A of 1200 ohms + 1.2 Hy being made to seemingly disappear and appear as an apparent open circuit, except for a signalling capacitance to ground through the 1200 ohms + 1 Hy impedance. This capacitance defining the signalling capacitance is desired to be low and is controlled by the propagation delay and processing delay of transmitting signals from locations A and B. An approximate equivalent circuit for the tip terminal only is illustrated in FIG. 3. It will be noted that a similar equivalent circuit exists between the ring terminals at locations A and B.

Figure 4D:
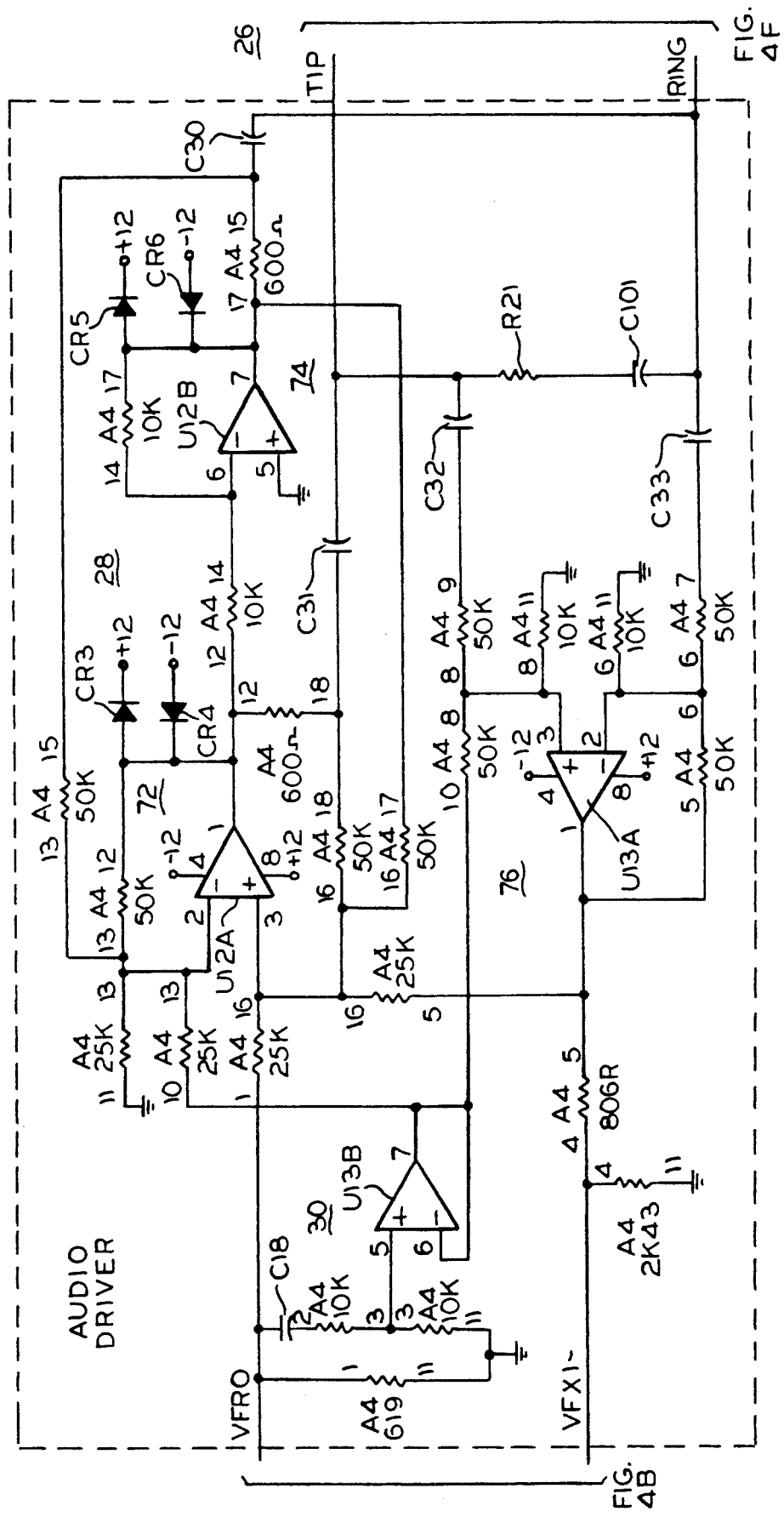
Figure 4E:
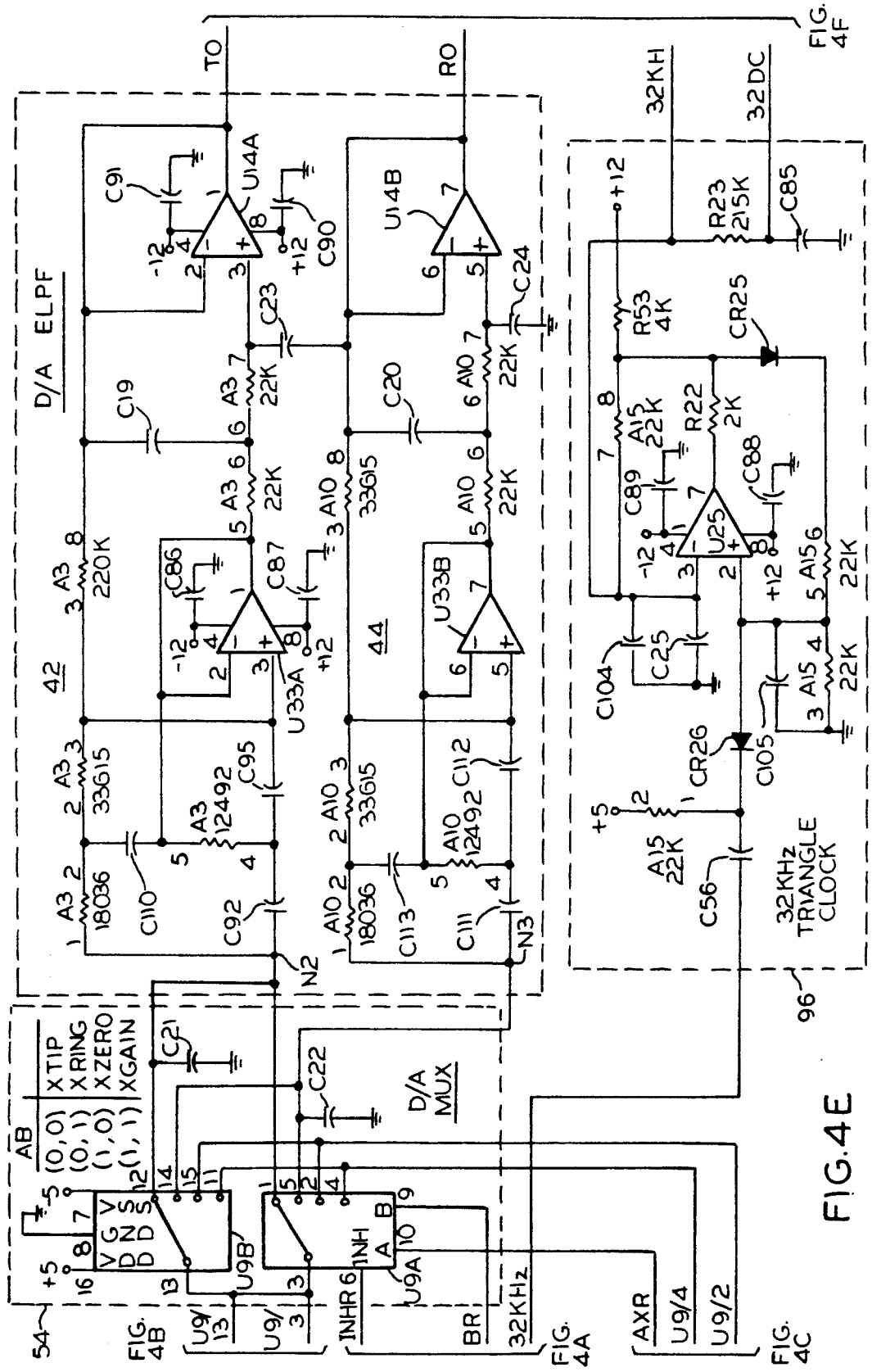
Figure 4F:
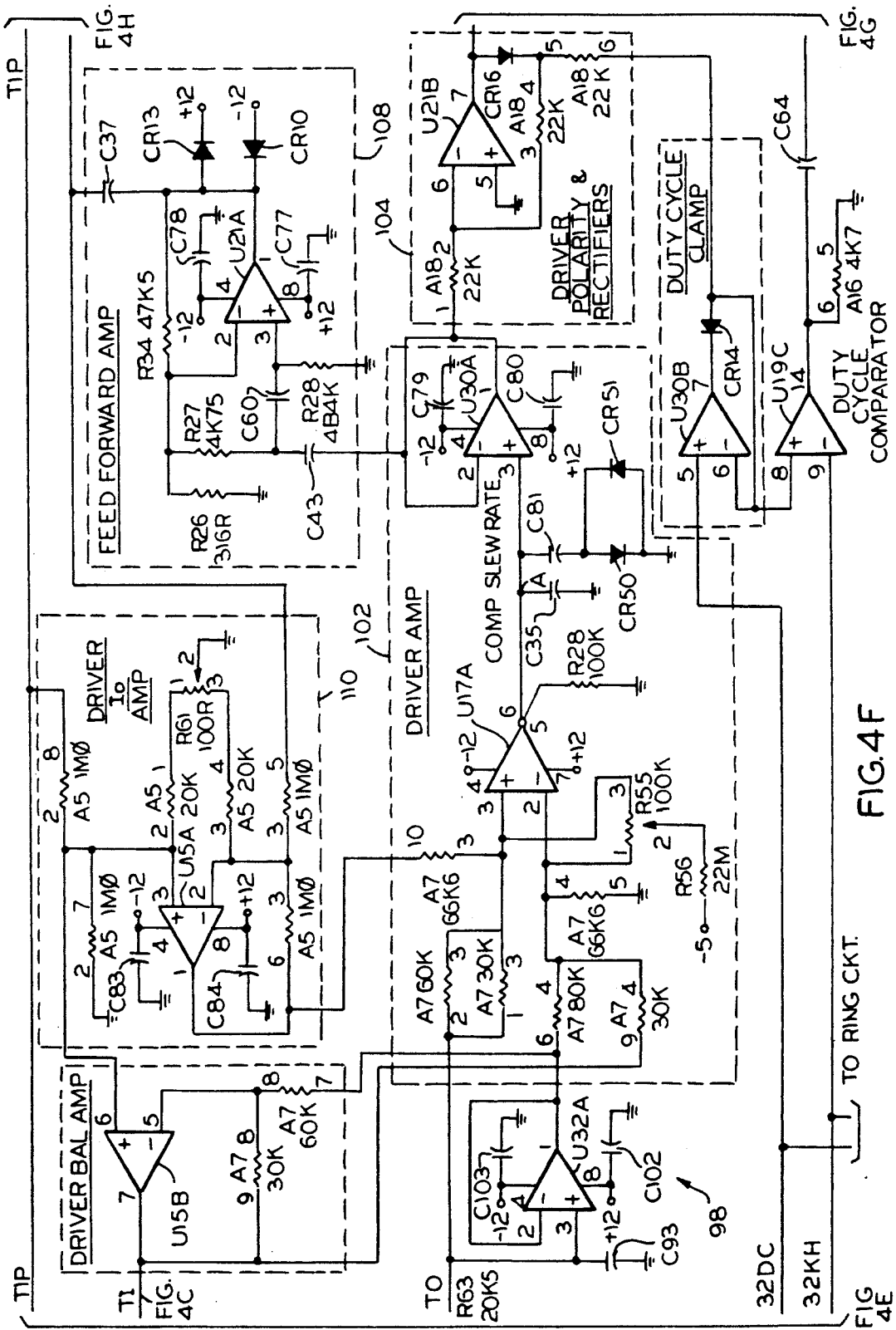

Referring now to FIGS. 4A-4H, when connected together, there is shown a schematic circuit diagram of the metallic channel unit network 20 of the present invention. In particular, FIGS. 4A-4E illustrates detailed circuitry for use in the various blocks 28, 30, 38-44, and 54-60 of FIG. 2. FIGS. 4F, 4G and 4H illustrate detailed circuitry for use in the blocks 46 and 50 of FIG. 2.

The audio driver 72 (FIG. 4D) is formed of an operational amplifier U12A which includes an input resistor (25K) A4/1-16 (this is used hereinafter to refer to pins 1 and 16 of the resistor array A4), a feedback resistor A4/13-12 (50K), and an output resistor A4/12-18 (600 ohms). The operational amplifier U12A receives the incoming "voice band" frequency signals from pin 3 of the CODEC U3 via the input resistor and drives the tip terminal through the output resistor. The operational amplifier U12A functions as a controlled output current amplifier which provides an output current from its input voltage on pin 2 and the tip terminal.

Similarly, the ring audio driver 74 is formed of an operational amplifier U12B which includes an input resistor A4/12-14 (10K), a feedback resistor A4/14-17 (10K), and an output resistor A4/17-15 (600 ohms). The operational amplifier U12B functions as an inverting amplifier for inverting the signals on the output of the operational amplifier U12A via its input resistor and drives the ring terminal through its output resistor.

The line amplifier driver 76 includes an operational amplifier U13A which is used to receive at its inputs the incoming differential "voice band" frequency signals applied across the tip and ring terminals. The non-inverting input of the amplifier U13A is connected via a series connection of the resistor A4/8-9 and the capacitor C32 to the tip terminal. The inverting input of the amplifier U13A is connected via a series connection of the resistor A4/6-7 and the capacitor C33 to the ring terminal. The capacitors C32 and C33 are used to block the "DC band" frequency signals and function with the respective series resistors (A4/8-9 and A4/6-7), output resistor A4/5-16 and amplifiers U12A, U12B in generating an AC input source impedance of 600 ohms + approximately 1 uf across the tip and ring terminals. The differential signals applied across the tip and ring terminals are normally at a 0 dB TLP (test level point) level, and the amplifier U13A has a gain of 1. The output (pin 1) of the amplifier U13A is connected to the CODEC U3 via a resistor divider formed by resistors A4/45 and A4/4-11. For the values shown, there is provided an attenuation of 2.5 dB. Further, these same resistors also form a source impedance of 600 ohms which provides an additional attenuation of 6 dB when loaded by the input resistor R16 coupled to the CODEC U3. Thus, the level of the signal at pin 4 of the resistor array A4 is equal to the standard test level of (−2.5 dB)+(−6 dB) or −8.5 dB TLP. The input resistor R16 (FIG. 4B) and the feedback resistor R15 are operatively connected to an internal operational amplifier in the CODEC U3 so as to provide a 12.5 dB gain. As a result, the analog input of the CODEC U3 receives a 4 dB TLP level (−8.5+12.5) which is required by the CODEC.

Referring now to FIGS. 2 and 4A-4E, there is shown a signal receive port 78 which is connectible via line 80 to a first transmission path of the channel bank multiplexer 14 (four-wire circuit) for receiving both encoded incoming "DC band" frequency signals and incoming "voice band" frequency signals. A transmit-out port 82 is connected via line 84 to a second signal transmission path of the channel bank multiplexer 14 for supplying both outgoing tip and ring terminals "DC band" frequency signals and outgoing "voice band" frequency signals. The incoming signals at the receive port 78 are separated by the channel logic gate array 36 into incoming "voice band" frequencies which are applied to the ADPCM processor 32 via line 86 and incoming tip and ring terminals "DC band" frequency signals which are applied to the D/A signal processing circuit 38 via line 88. The incoming "voice band" frequency signals appearing at a first node N1 connected to the CODEC 34 via the line 87 of the processor 32 and are send to the tip and ring terminals via the voice hybrid driver 28 as previously described. With respect to the incoming tip and ring terminals "DC band" frequency signals, the processing 10 circuit 38 causes the incoming tip terminal "DC band" signals to appear at a second node N2 and the incoming ring terminal "DC band" signals to appear at a third node N3. The signals at the nodes N2 and N3 at the output of the first multiplexer 54 are sent separately to the tip and ring terminals via the respective high efficiency switching drivers 46 and 48.

With respect to the incoming differential "voice band" frequency signals applied to the bidirectional port 26, it will be recalled that they are converted to single-ended outgoing "voice band" frequency signals by the line amplifier driver 76 of the voice hybrid driver 28 and are send to the CODEC 34 at a node N4. These outgoing "voice band" frequency signals are then sent from the CODEC 34 to the gate array 36 via the line 89, the ADPCM processor 32, and the line 91.

It will be noted that in order to cancel the signal at the input of the line driver U13A (FIG. 4D) due to signals arriving at the node N1 from the receive path so that they are prevented from being returned to the transmit path via the node N4, there is needed the reference/balance circuit 30 which has a source resistor A2/2-3 (10K representing 600 ohms) and a signal equal in magnitude to ½ of the signal from the receive path but opposite in phase when terminated with a termination resistor A4/3-11 (10K representing 600 ohms). The line amplifier U13A is connected so that the voltage developed across the resistor A4/3-11 will cancel the line voltage originating from the four-wire circuit and sensed through the capacitors C32 and C33. However, this creates another error path via the output of the amplifier U13B through the input resistor A4/10-8 (50K) and the feedback resistor A4/5-16 to the non-inverting input of the tip audio driver U12A. This error is canceled by connecting the output of the error canceling amplifier U13B through an input resistor A4/-10-13 (25K) to the inverting input of the tip audio driver U12A.

The channel logic gate array 36 (U1) provides the proper address decoding for reception and transmission on the respective lines 80 and 84. In particular, the gate array 36 (U1) interfaces with the ADPCM voice processor 32 via the lines 86, 91 to accept and provide 4 bit voice information and interfaces with the A/D signal processing circuit 40 and the D/A signal processing circuit 38 to accept and provide encoded DC information. Further, the gate array send and receive (1) DC polarity and (2) 10 framing (synchronization or signalling) information. A unique framing scheme is generated and detected by the gate array for use in synchronization and data retrieval.

This unique framing (synchronization/signalling) scheme uses a modulo 8 counter whose various states determine the information to be transmitted (see Table 1 below).

TABLE 1

| COUNTER | | | |
|---|---|---|---|
| MSB | MB | LSB | TRANSMITTED BIT* |
| 0 | 0 | 0 | ∅ (Sync) |
| 0 | 0 | 1 | "A" (Signalling) |
| 0 | 1 | 0 | ∅ (Sync) |
| 0 | 1 | 1 | "B" (Signalling) |
| 1 | 0 | 0 | 1 (Sync) |
| 1 | 0 | 1 | "A" (Signalling) |
| 1 | 1 | 0 | 1 (Sync) |
| 1 | 1 | 1 | "B" (Signalling) |

(*Any of these bits are referred to as frame bits.)

The counter is updated every 6th frame, so a sync bit is sent every 12th frame. A complete sync pattern is "∅" "∅" "1" "1" as shown in Table 1. The signalling bits are not used by every embodiment. All of the voice, framing, polarity and DC information are configured into one of three transmission formats. The gate array also controls the autozero circuitry 58 and the autogain circuitry 60 so as to perform automatically the autozero and autogain functions in-between send and receive samples for correcting errors occurring in the A/D and D/A converter circuitry, as will be later described.

In the receive mode, the gate array U1 is addressed when the three address lines (RSPO, RSQ, RWD) on pins 11, 12, 10 are high simultaneously. When the gate array is addressed, it will generate a frame synchronizing pulse FSY for the ADPCM voice processor 42 and the CODEC U3. In the transmit mode, there are also three address lines (TSPO, TSQ, TWD) on pins 4, 5, 3. When these address lines are made high simultaneously, the gate array is addressed to generate a frame synchronizing pulse FSX to the voice processor U2 and the CODEC U3 so as to cause the voice data to be delivered to the line 84 via the signal transmit-out port 82.

For each "DC band" transmission sample, there is contained a polarity bit, 11 bits of data information representing the amplitude of the DC signal, and for each "voice band" transmission sample, there is 4 bits of voice information. In one of the three transmission formats, this is achieved by utilizing three frames each having 8 bits of information. Each new complete "DC band" polarity/data sample (every three frames) alternates between the tip and ring terminal information. Thus, the voice, polarity and data information are arranged over three frames wherein (1) the first frame contains 3 bits of voice, a framing bit, a polarity bit, 3 bits of data, (2) the second frame containing 4 bits of voice and 4 bits of data, and (3) the third frame containing 4 bits of voice and 4 bits of data. The framing bit is sent in place of the 4th voice bit every 6th frame. This framing bit will alternate between a sync bit and signalling bit. Thus, a sync bit is sent every 12th frame, and a signalling bit could also be sent every 12th frame.

In a second one of the three transmission formats, 16 consecutive bits are used to send information in one frame wherein the 4 voice bits are sent first (every 6th frame will have only 3 voice bits and one framing bit), the polarity bit is sent next, and 11 bits of data information is sent last. The polarity and data will alternate each frame between the tip and ring terminal information. The third one of the transmission formats is quite similar to the second one and is arranged in exactly the same manner. The only difference is that the circuitry is designed to send the last 8 bits of data in response to the bank address lines RSPO, RSQ and RWD, which causes these bits to be sent a little later on in the frame rather than being sent immediately after the first 8 bits. The embodiment utilizing this third transmission format uses A and B signalling bits to control the sleeve lead circuitry for one of the test line applications.

However, it will be noted that each of the transmission formats utilize 12 bits for the "DC band" data information (one polarity bit and 11 bits for the magnitude). This is completely different from the '160 patent which uses 7 bits for voice information and only 1 bit for data information. As a result, the present invention allows the "DC band" frequency signals to be transmitted at a faster rate thereby reducing signalling capacitance.

The CODEC 34 (U3) is the type similar to TP3054 which is commercially available from National Semiconductor Corp. The analog incoming voice band frequency signals applied on its pin 15 is encoded into an 8-bit PCM format and sent out as a signal DX at its pin 11 to the ADPCM voice processor U2. The voice processor compresses the 8 bit signals into 4 bit signals for transmission over the second signal path via the gate array 36 (U1). The ADPCM is the type similar to DS2167 which is sold by Dallas Scientific Corp. The gate array U1 also generates a frame synchronizing pulse FSX on pin 27 for use by the voice processor and CODEC which enables a transmit 1.544 MHz clock signal TCLK received on pin 14 of the processor and pins 9, 10 of the CODEC. This clock signal causes the signal DX in PCM format to be shifted out on pin 11 of the CODEC, passing through the voice processor via pin 16, and to pin 47 of the gate array.

Digital incoming voice frequency signals from the gate array U1 are applied to pin 23 of the voice processor and received on pin 6 of the CODEC as pulsed signals DR. The gate array U1 also sends the frame synchronizing pulses FSR to pin 5 of the CODEC which enables a receive 1.544 MHz clock signal RCLK applies to its pins 7 and 8. The RCLK signal causes the pulsed signals DR to be shifted into the CODEC U3. The pulse signals DR are converted to an analog signal via an internal filter and power amplifier and is driven out on pin 3 (node N1) as a signal VFRO.

As will be recalled, the capacitors C32 and C34 block dc signals. Therefore, the DC to 300 Hz or "DC band" signals applied to the tip and ring terminals will not be transmitted by the line amplifier U13A in the voice hybrid driver 28, but will be transmitted separately via the tip sense amplifier 50 and the ring sense amplifier 52. Since the DC to 300 Hz operation for the tip and ring sense amplifiers 50, 52 is identical, it will be sufficient to discuss only the operation of the tip sense amplifier 50. The incoming tip "DC band" frequency signals representative of alarm signals from the alarm-detection equipment at location A are received at the tip terminal of the bidirectional port 26. These "DC band" signals are fed to the non-inverting input of the tip sense amplifier U15B via a voltage divider formed by resistors A5/2-8, A5/2-7 and A5/2-1 (FIG. 4F) the output of the sense amplifier U15B is connected to pin 1 of the A/D multiplexer 56 (U10A) which selects one of four input signals: (1) tip, (2) ring, (3) autozero, and (4) autogain. It will be noted that the corresponding incoming ring terminal "DC band" frequency signals are received on pin 5 of the multiplexer U10A.

The analog-to-digital (A/D) signal processing circuit 40 is connected to receive the tip terminal "DC band" frequency signals and the ring terminal "DC band" frequency signals appearing on the respective pins 1 and 5 of the multiplexer U10A. The pins 1 and 5 of the multiplexer U10A in FIG. 4C correspond to the nodes N5 and N6, respectively, of FIG. 2. Multiplexer U10A has control logic inputs at pins 10 and 9, which are connected to respective pins 42 and 28 of the gate array 36. Each of the logic signals from the pins 42 and 28 can be at a logic "∅" or a logic "1". The truth table for these logic signals is shown below the multiplexer U10A. For example, the multiplexer U10A is shown in the position when both the pins 10 and 9 are receiving the logic "∅". The logic signal on the pin 9 may be logic "∅" and the logic "1" so that the tip and ring "DC band" frequency signals are sampled alternately at a rate of 1.33 KHz (first transmission format) or 4 KHz (second or third transmission format). A composite tip/ring sampled signal appears at the output on pin 3 of the multiplexer U10A and is fed to an A/D polarity circuit 90 which is formed of operational amplifiers U8B, U8A and switches U11C, U10B.

The output of the multiplexer U10A via pin 3 is connected to the non-inverting input of the operational amplifier U8B which detects the polarity of the composite signal. All values of a negative polarity in the composite signal are inverted by the operational amplifier U8A whose inputs are controlled by the switch U11C. If a negative signal appears at the output of the multiplexer U10A, the output of the operational amplifier U8B will be at a logic "∅". This logic "∅" defining a transmit polarity signal XPOL is sent to pin 35 of the gate array 36, indicating that a signal having a negative polarity has been transmitted. Further, the control input at pin 11 of the switch U11C will be at the logic "∅" causing the switch to maintain the position as shown. As a result, the polarity detection amplifier U8A will be connected in the configuration of an inverting amplifier having a gain of 1. Thus, the voltage at the output of the operational amplifier U8A via pin 1 will be positive. On the other hand, if a positive signal appears at the output of the multiplexer U10A, the output of the operational amplifier U8B will be at a logic "1". This transmit polarity signal being at the logic "1" will again be sent to the gate array and to the control input (pin 11) of the switch U11C. Consequently, the switch U11C will move to the other position making a connection between its pins 13 and 14. This, in turn, connects the amplifier U8A in the configuration of a non-inverting amplifier with a unity gain. Accordingly, the voltage at the output of the amplifier U8A will again be positive.

The output of the operational amplifier U8A is fed directly to the input (pin 2) of an A/D converter U5. The A/D converter U5 is the type similar to MAX170 which is commercially available from Maxim Integrated Products. The output digital signal from the output (pin 5) of the A/D converter U5 is fed to pin 26 of the gate array 36. The encoded signal from the gate array 36 (FIG. 4A) at the sending end (location A) is transmitted on pin 6 (TDATA) via the control of pins 3, 4 and 5 over the transmission line 12 to the gate array 36a (location B) at the receiving end. The gate array 36 receives the encoded transmitted signals from the gate array 36a on pin 7 (RNPCM) under the control of the pins 10, 11 and 12.

The digital-to-analog (D/A) signal processing circuit 38 is coupled to receive the digitally encoded signals from the channel logic gate array 36. For convenience of discussion, it will be assumed that the receiving end (location B) is sending back the same signals to the sending end (location A). To this end, the encoded signals from the output of the gate array 36 via pin 39 is delivered to the input (pin 6) of a D/A converter U4 (FIG. 4B). The D/A converter U4 is the type similar to MAX543 which is commercially available from Maxim Integrated Products. The output analog signal from the output (pin 3) of the D/A converter U4 is fed to the input of an operational amplifier U6A whose output on pin 1 is between ∅ to +5.0 volts. The D/A converter U4 receives an input reference signal of +5.0 volts on its pin 1. This +5.0 volts is obtained via a voltage divider formed by resistors R10 and R9 (FIG. 4C). A Schottky diode CR40 is also connected to the output (pin 3) of the D/A converter U4 for clamping it and preventing it from going negative, thereby avoiding latch-up. The resistor R7 and the internal resistance of the D/A converter U4 sets the gain of the operational amplifier U6A. The capacitor C14 functions as a compensating capacitor so as to provide a maximum rise time without a large overshoot.

The original signal polarity is received by the gate array 36 and is available on pin 34 as the signal RPOL which is sent to the control input (pin 9) of the switch U11B. The switch U11B is used to invert the original signal polarity so that the voltage received by the switching drivers 48, 50 will be the same polarity with respect to the tip (ring) sending voltage signal. If the original polarity was positive, the polarity signal RPOL will be high causing the operational amplifier U6B to be configured as a non-inverting amplifier as shown with a unity gain. If the original polarity was negative, the polarity signal RPOL will be low so as to cause the operational amplifier U6B to be switched to an inverting configuration with a unity gain.

The output of the D/A processing circuit 38 is defined by the output (pin 7) of the operational amplifier U6B which is delivered to the inputs (pins 3 and 13) of the dual multiplexer U9A, U9B (FIG. 4E). As can be seen, the control logic inputs (pins 10 and 9), which are connected to respective pins 42 and 41 of the gate array U1. Each of the logic signals from the pins 42 and 41 can be at a logic "∅" or a logic "1". The truth table for these logic signals is shown above the multiplexer U9B. For example, the dual multiplexer U9A and U9B is shown in the position when both the pins 10 and 9 are receiving the logic "∅". The logic signal on the pin 9 may be switched at the sampling rate, i.e., 1.33 KHz (first transmission format) or 4 KHz (second or third transmission format), between the logic "∅" and the logic "1" so that the voltage at the output of the amplifier U6B will charge up alternately the capacitors C21 and C22. The capacitors C21 and C22 sample and hold the values of the output voltages from the amplifier U6B. Further, the dual multiplexer U9A, U9B switch the output of the amplifier U6B to one of four outputs: (1) tip, (2) ring, (3) autozero, and (4) autogain. The resistor R54 connected to the output (pin 6) of the amplifier U6B is provided so as to limit the current to the input of the dual multiplexer and thus prevent a latch-up condition.

In order to accurately encode and decode the transmitted tip (ring) sending voltage signals, there is provided the autozero circuit 58 (FIG. 4C) which is comprised of operational amplifier U7B, resistors R18 and A2/5-6, and capacitor C17 (FIG. 4C). When the multiplexer U9A is switched to the "zero" position, a digital signal from the A/D converter U5 corresponding to "zero" input voltage is looped inside the gate array U1 and sent to the operational amplifier U7B via the D/A converter U4 and resistor R18. Any error will cause the capacitor C17 to charge up, and an output voltage will be send through the resistor A2/5-6 to the input of the A/D converter U5 so as to effectively cancel the offset error. The main source of the offset error is from the A/D converter U5. The multiplexer U9A is switched to the autozero or autogain state when the A/D and D/A converters are not being utilized for the tip and ring functions.

During this idle time, the autogain function is also performed by sending a known input voltage to the A/D converter U5 via pin 4 of the multiplexer U10A. The value of this input voltage is determined by the voltage divider formed by resistors R13 and R90. For the values shown, a voltage of approximately −4.77 volts is applied to the input (pin 2) of the A/D converter U5. This signal is looped around digitally via the gate array U1 and appears at the output (pin 7) of the operational amplifier U6B which couples the same to the input of the autogain amplifier U7A via the multiplexer U9A and U9B via the resistor R17. Any error will cause a current to flow so as to charge up capacitor C16, thereby creating an error signal. This error signal is sent through resistor R93 to the reference input (pin 1) of the D/A converter U4 so as to adjust the input reference voltage.

Since the digital signal transmitted and received by the gate array U1 is a 12-bit signal with the MSB (most significant bit) being a polarity bit, there are only 11 bits that can be used for digital information. For a ±5 volts analog at the input of the A/D converter U5 and at the output of the D/A converter U4, there is a maximum of 2,048 code steps or 2.44 millivolts per step. In order to obtain a finer resolution on the A/D conversion process, a squarewave of 187 Hz from pin 33 of the gate array U1 is converted by an A/D ripple injection circuit 92. The ripple injection circuit is comprised of resistors A2/1-2, A2/3-4 and capacitor C13 and is used to convert the squarewave into a triangularwave of a magnitude equal to approximately one code step. The output of the injection circuit 92 is connected to the input (pin 2) of the A/D converter U5 via the resistor A2/3-4. In order to cancel this data error due to the injection circuit 92, a D/A ripple cancellation circuit 94 is connected to the D/A signal processing circuit 38. The cancellation circuit 94 consists of resistors R96 and R5 and capacitor C12. The input of the cancellation circuit is from a 187 Hz squarewave at pin 44 of the gate array U1, and the output of the cancellation circuit is fed to the inverting input of the operational amplifier U6A via resistor R6. The ripple injection circuit causes the A/D sample to toggle between the two closest samples at a duty cycle proportional to the closest sample, thereby producing a DC value output proportionally between the code steps to give a significant increase in resolution.

The tip filter network 42 (FIG. 4E) comprised of an elliptical low pass filter 42 and the ring filter network 44 comprised of an elliptical low pass filter 44 are connected to the respective outputs of the holding capacitors C21 and C22 for the tip and ring sampled signals. In order to eliminate quantizing noise, the elliptical filters have been designed to effectively attenuate the dominant component of the sampling rate used, which is typically 1.33 KHz (first transmission format) or 4 KHz (second or third transmission format). The elliptical filter 42 includes an active elliptical filter having a notch at the sampling rate and being formed by operational amplifier U33A and its associated components, and a second order low pass filter formed by operational amplifier U14A and its associated components. The output of the tip filter network 42 is coupled to the X50 high efficiency tip switching driver 46. Similarly, the elliptical low pass filter 44 includes an active elliptical filter having a notch at the sampling rate and being formed by an operational amplifier U33B and associated components, and a second order low pass filter formed by operational amplifier U14B and its associated components. The output of the ring filter network 44 is coupled to the X50 high efficiency ring switching driver 48.

A free-running clock oscillator 96 (FIG. 4E) is comprised of comparator U25, a feedback resistor A15/7-8, and a shunt capacitor C25. The oscillator output is from pin 3 of the amplifier U25 which is a triangularwave at a frequency of 32 KHz. The voltage goes from exactly $\emptyset$ volts to a positive magnitude, i.e., +4.0 volts. The precise zero crossing is achieved by the diode CR25. The oscillator 96 is synchronized to a frequency of 32 KHz generated from pin 24 of the gate array U1. This synchronization is required so as to eliminate interference with other high frequency signals so that the switching drivers 46, 48 do not generate audible low frequency signals which are not desired. The synchronizing pulses from the gate array U1 is received via a capacitor C56, resistor A15/1-2, and a diode CR26 at the non-inverting input of the operational amplifier U25. Further, the oscillator generates a 32 KHz DC component which is accomplished by resistor R23 and capacitor C85. This 32 KHz DC component is a DC voltage which is halfway between the positive triangularwave and the negative triangularwave.

Referring again to FIG. 2, there is shown a DC tip balance circuit 98 which consists of an inductor (1.2 Hys), a 1200-ohm resistor, and a 600-ohm resistor. The inductor and the 1200-ohm resistor define a source impedance (matching the source impedance of switching drivers), and the 600-ohm resistor is a termination impedance. The balance circuit 98 is used to control the signals due to the receive path (the filter network 42) that are returned to the transmit path (the multiplexer 56) via the tip switching driver 46 and the tip sense amplifier 50. The output of the switching driver 46 is connected to the tip terminal via a series output impedance $Z_t$ of 1.2 Hys+1200 ohms. A voltage divider 99 formed by a 1 Meg resistor and a 20K resistor is connected between the tip terminal and the ground potential. It will be noted that the signal from the receive path is sent to the inverting input of the sense amplifier 50, which also performs the balancing function, through the source impedance of the balance circuit 98 in order to cancel or adjust the signals applied to the non-inverting input of the tip sense/balance amplifier 50. Similarly, a DC ring balance circuit 100 is provided for operation in connection with the ring switching driver 48 and the ring sense/balance amplifier 52. A key to the overall objective of reducing the effective signalling capacitance and maintaining a 600 ohm DC connection is the 1200 ohm/600 ohm source/balance values.

Since the switching drivers 46 and 48 and their associated circuitry for the tip and ring terminals are identical, it will be sufficient to illustrate and describe only the tip switching driver 46 and its associated circuitry. In FIGS. 4F, 4G and 4H, there is shown a schematic circuit diagram in more detail of the balancing circuit 98, tip switching driver 46, and the tip sense/balance amplifier 50 as shown in FIG. 2. The buffer amplifier U32A, resistor R63, and capacitor C93 corresponding to the balancing circuit 98 of FIG. 2 provides the same results, but the rather large 1.2 Hys inductor has been eliminated, thereby reducing costs. The operational amplifier U15B corresponds to the sense/balance amplifier 50 of FIG. 2. The resistors A5/2-8, A5/2-7 and A5/2-1 are used to perform the function of the voltage divider 99. The output impedance $Z_t$ is defined by inductor L1 and resistor R45 (FIG. 4H). It will be noted that pin 2 of the resistor array A5 is connected to the non-inverting input of the operational amplifier U15B and the output of the buffer amplifier U32A is fed via input resistor A7/7-8 (60K) to the inverting input of the operational amplifier U15B. The output (pin 7) of the amplifier U15B is connected to the multiplexer U10A (FIG. 4C). This forms the balance circuit 50 and the balance amplifier 50 for the tip switching driver 46.

The tip switching driver 46 receives a −48 VDC as its main source of power and generates ±200 volts output swing for driving the tip terminal. The switching driver 46 is used to charge up the primary winding of a transformer T1 either positive via pins 4 and 5 or negative via pins 5 and 6. Then, the primary winding is switched off and the secondary winding via pins and 3 is switched on so as to allow the stored energy to be transferred to a load. Since the primary and secondary windings of the transformer T1 is being switched on and off on a continuous basis, an output voltage will be developed equalling an AC ripple riding on top of a DC component when the tip terminal is loaded. The magnitude of the output voltage is dependent upon the duty cycle of pulses generated.

As can be seen from the detailed schematic diagram of FIGS. 4F through 4H, the tip switching driver 46 is comprised of a driver amplifier 102 (FIG. 4F), a drive polarity and rectifier circuit 104, power FET drivers 106 (FIG. 4G), a feed forward amplifier 108 (FIG. 4F), a driver output current ($I_t$) amplifier 110, a duty cycle clamp circuit 112, a comparator U19C (FIG. 4F), a driver flip-flop 114 (FIG. 4G), and their associated circuitry. The driver amplifier 102 (FIG. 4F) includes a conventional transconductance amplifier U17A which provides a differential input, and provides a single-ended high impedance output, a very large gain, and a compensation node A at its output pin 6. A potentiometer R55 and a resistor R56 are provided to adjust input offset voltage of the amplifier U17A. The transconductance gm of the amplifier U17A is controlled by resistor R29 connected between the output pin 5 and the ground potential. A capacitor C35 connected between the output pin 6 and the ground potential is a compensation capacitor. The capacitor C81 and the diodes CR50, CR51 form a slew rate limiter so as to limit the output voltage rise time for large signals. The driver amplifier 102 also includes a buffer formed by operational amplifier U30A having its non-inverting input connected to the output of the amplifier U17A. The output (pin 1) of the operational amplifier U30A defines the output of the driver amplifier 102.

The non-inverting input of the amplifier U17A receives the DC band frequency signals from the tip filter network 42 via input resistors A7/2-3 and A7/1-3 which are connected in parallel. As previously discussed, the output of the buffer amplifier U32A is fed to the inverting input of the sense/balance amplifier U15B via resistor A7/8-7 in order to control the incoming signals to the tip switching driver 46 that are being returned to the transmit path. However, this creates an error path through the sense/balance amplifier U15B via the resistors A7/8-7, A7/8-9 and A7/9-4 to the inverting input (pin 2) of the amplifier U17A. In order to cancel this error, an additional input resistor A7/6-4 (60K) is connected from the output of the buffer amplifier U32A to the inverting input of the transconductance amplifier U17A.

The feed forward amplifier 108 functions as a second order high pass filter and includes an operational amplifier U21A having its inputs coupled to the output of the driver amplifier 102 and its output (pin 1) coupled to the output impedance $Z_o$ via capacitor C37. The diodes CR10, CR13 serve to protect the operational amplifier U21A against damage caused by transients. The operational amplifier U21A provides a high gain (approximately 100) only at high frequencies (above 1 KHz) and serves to bypass the power FET drivers 106 at high frequencies, thereby maintaining closed loop stability. The closed loop gain of the operational amplifier U21A is about twice the gain of the transconductance amplifier U17A because of the voltage divider effect caused by the capacitor C37 being connected in series with parallel combination of capacitor C47 and C65 (FIG. 4H).

The driver output current ($I_o$) amplifier 110 includes an operational amplifier U15A which senses the voltage across the output impedance $Z_o$. The amplifier U15A receives differential inputs via input resistors A5/2-8 and A5/3-5 and has feedback resistors A5/2-7 and A5/6-3. The resistors A5/2-1 and A5/3-4 also provide for attenuating of the large longitudinal signals of up to ±200 volts from the tip terminal. The output (pin 1) of the operational amplifier U15A is connected to the non-inverting input of the driver amplifier 102 so as to increase the actual values used for the output impedance (0.1 Hys and 100 ohms) appears to be 1.2 Hys+1200 ohms. In this manner, the approximate equivalent circuit of FIG. 3 is accomplished. Since the actual values of the inductance and resistance is relatively low, the switching driver 46 will operate with less power dissipation, less power consumption and lower signalling capacitance. The potentiometer R61 is used to correct for any error caused by the longitudinal attenuation resistors A5/1-2 and A5/3-4.

The driver polarity and rectifier circuit 104 (FIG. 4F) consists of an operational amplifier U21B which also receives the signals from the output of the driver amplifier 102 via its input resistor A18/1-2. If the input signals are positive, its output (pin 7) will be negative so as to reverse bias the diode CR16. Thus, the signals at its input (pin 6) will be sent through the resistors A18/3-4 and A18/5-6 to the inverting input (pin 8) of the comparator U19C as positive signals. On the other hand, if the input signals are negative, the output (pin 7) will be positive and the diode CR16 will be rendered conductive so as to pass this inverted or rectified (positive) signal through the resistor A18/5-6 to the pin 8 of the comparator U19C. Therefore, the signals at the inverting input of the comparator U19C defining a slow varying control signal will always be positive.

Figure 5:
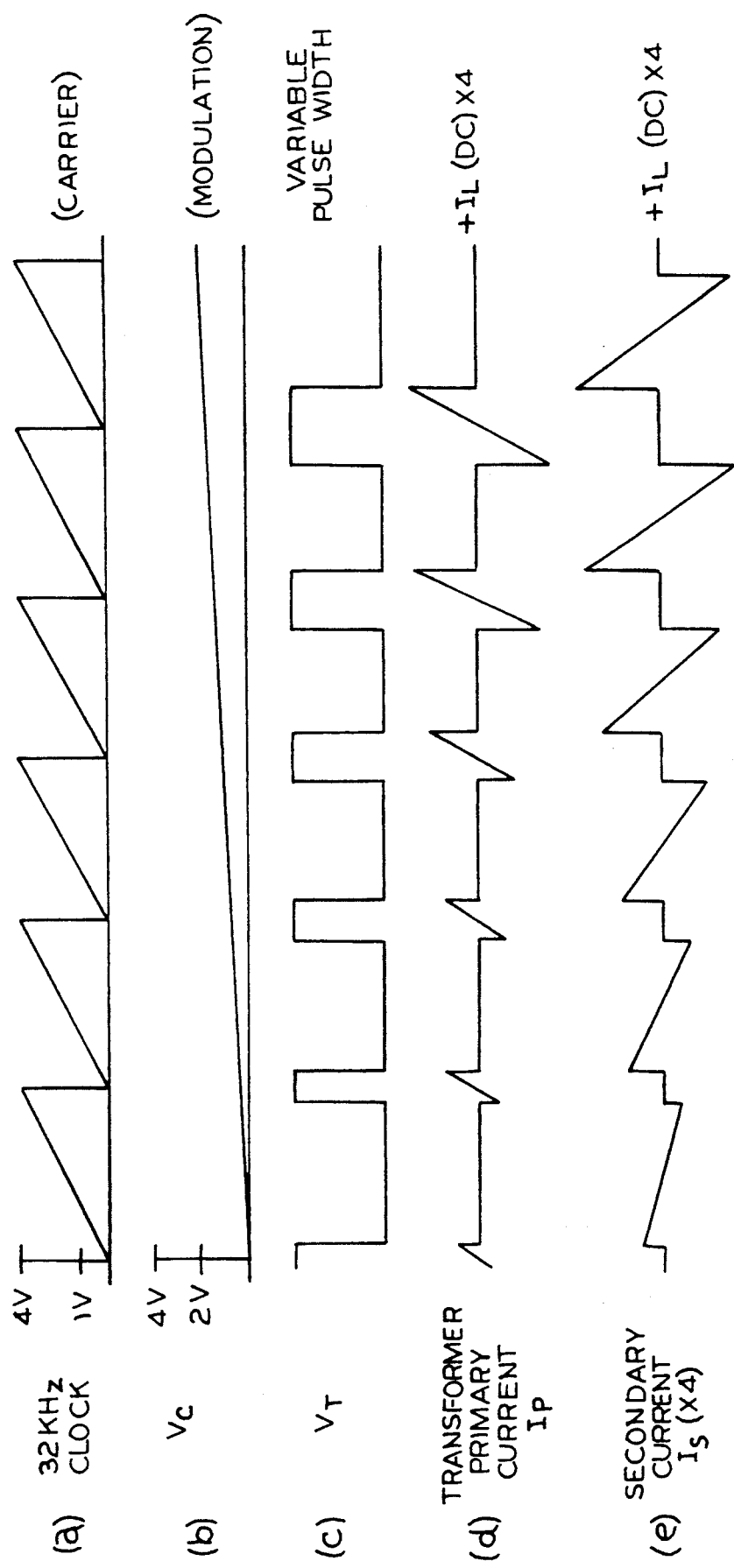
FIGS. 5(a) through 5(e) show waveforms useful in understanding the operation of the tip switching driver 46 illustrated in FIGS. 4F–4H.

The duty cycle clamp circuit 112 includes an operational amplifier U30B having its non-inverting input connected to receive the 32 KHz DC component from the oscillator 96 (FIG. 4E) and its inverting input connected to receive also the control signal at pin 8 of the comparator U19. The output of the clamp circuit 112 is at the anode of the diode CR14 which is clamped to the 32 KHz DC component whenever the control signal on pin 6 of the operational amplifier U30B exceeds this 32 KHz DC component. The non-inverting input of the comparator U19C receives the triangular waveform having a frequency of 32 KHz and a voltage swing of approximately between $\emptyset$ and +4.0 volts as generated by the oscillator 96. The waveform from the 32 KHz oscillator 96 is illustrated in FIG. 5(a). The slow varying control signal is illustrated in FIG. 5(b). Consequently, the output of the comparator U19C provides a 32 KHz squarewave whose pulse-width or duty cycle is proportional to the control signal applied to its inverting input (pin 8). The output of the comparator U19C is shown in FIG. 5(c). For the control signal varying between $\emptyset$ and a maximum voltage of 2 volts as shown in FIG. 5(b), the squarewave will have a variable pulse-width or duty cycle between $\emptyset$ and 50%.

The squarewave output of the comparator U19C is coupled via a capacitor C64 to the input of the driver flip-flop 114 (FIG. 4G) formed by inverter U23D and U23C. The edges of the squarewave output are converted to narrow pulses at the input of the inverter U23D via the capacitor C64 and resistor A13/1-2. The output of the driver flip-flop is pin 7 of the inverter U23C which is latched either high or low through the resistor A13/1-2 depending upon the direction of the narrow pulses.

The power FET drivers 106 includes inverters U23A, U23B, U23E, and U23F whose outputs (pins 3, 5, 11 and 13) are used to drive the respective gates of the power field-effect transistors Q5, Q7, Q3 and Q1 (FIG. 4H). The transistors Q3, Q5 and Q7 are P-channel devices, and the transistor Q1 is an N-channel device. The output of the driver flip-flop (pin 7) is coupled to the FET driver U23A-pin 2 via resistor A9/3-4 and diode CR11, to the FET driver U23B-pin 4 via resistor A9/1-2 and diode CR15, and to the FET driver U23F-pin 14 via resistor A13/5-6 and diode CR9. The negative output of the driver flip-flop U23D is also coupled to the FET driver U23E-pin 12 via resistor A13/3-4 and diode CR12.

If the polarity from the driver polarity and rectifier 104 (pin 7 of U21B) is positive, pin 2 of the FET driver U23A will be held low through the diode CR41 and the driver flip-flop 114 will charge up the input capacitance at pin 4 of U23B via the resistor A9/1-2 during positive transitions. Then, the transistor Q7 will be slowly turned on so that the −48 volt supply is applied across the primary winding of the transformer T1/4-5 (FIG. 4H). If the polarity is negative however, pin 4 of the FET driver 23B will be held low and the driver flip-flop will charge up the input capacitance at pin 2 of U23A via the resistor A9/3-4. Thus, the transistor Q5 will be turned on slowly so that the −48 volt supply is applied across the primary winding of the transformer T1/5-6. During negative transitions of U23C, the output of the driver flip-flop 114 will drive either pin 4 of U23B via the diode CR15 or pin 2 of U23A via the diode CR11 with little delay so as to quickly turn off the corresponding conducting transistor Q7 or Q5.

Simultaneously, during these negative transitions, the output of the driver flip-flop will charge down the input capacitance at pin 14 of driver U23D via the resistor A13/5-6. Then, the N-channel transistor Q1 will be slowly turned on so as to connect the secondary winding of the transformer T1/1-3 to the ground potential. Further, the inverting node B (pin 9) of the driver flip-flop 114 will charge up the input capacitance at pin 12 of driver U23E via the resistor A13/3-4. This causes the P-channel transistor Q3 to be rendered conductive. In this manner, the turning off of the power field-effect transistors coupled to the primary winding is made to occur before the turning on of the power field-effect transistors coupled to the secondary winding (or vice-versa). This serves to prevent simultaneous conductions of the transistors coupled to the primary and secondary windings, thereby avoiding stress on the devices.

Since the transistor Q1 is an N-channel device, a diode CR31 is connected to its gate electrode for providing a level shifting and a speed-up capacitor C106 so as to facilitate fast transitions. The blocking diodes CR27 and CR28 (FIG. 4H) are used to prevent conduction when both transistors Q1 and Q3 are switched off. The diode CR43 serves to protect the transistors Q and Q3 due to the transients occurring from the stray inductance and stray capacitance of the transformer T1. The transistors Q1 and Q3 are switched "off" when transistor Q5 or Q7 is on, and "on" when the transistors Q5 and Q7 are both off at a 32 KHz rate with the duty cycle being determined by the control signal from the output of the driver polarity and rectifier 104.

In order to provide protection for the power field-effect transistors Q1, Q3, Q5 and Q7, during start-up, shut down, or overload conditions, there is provided a current trip detector 116 (FIG. 4G) which includes comparators U19B, U19D and sensing resistors R35, R36, R39 and R40 connected to the source electrodes of the respective transistors Q3, Q1, Q5 and Q7 to detect current flow. When the current exceeds a certain predetermined limit, the outputs (pins 1 and 13) of the comparator U19B, U19D will cause the driver flip-flop 114 to be switched to the opposite state.

Due to the fast switching speeds, the secondary ripple current at pin 3 (FIG. 4H) at the secondary winding of the transformer T1 can be quite large. The filter network formed by capacitors C45, C65 and inductors L3, L5 is tuned to 32 KHz so as to trap the carrier or fundamental frequency. Thus, the voltage on the right side of the capacitor C45 has a substantially reduced ripple. Further, any high frequency switching spikes will be trapped by the output filter 118 so that the output on the right side thereof is typically less than 1 volt ripple. In addition, attenuation will also occur due to the output impedance of the inductor L1 and the resistor R45. A resistor R59 is connected between the tip terminal and the ground potential so as to control the output leakage current. An input filter 20, inductor L7 and capacitors C49, C51 are added to filter out spikes occurring to the −48 volt supply which is fused by F4.

For the control signal of FIG. 5(c) being used to switch on and off the primary and secondary windings, a transformer primary current waveform is shown in FIG. 5(d), and a transformer secondary current waveform is shown in FIG. 5(e). The magnitude of the secondary current and the output voltage is based upon the turns ratio of the primary and secondary windings and the duty cycle. With no load connected to the tip terminal, there would be effectively no dc current with just the AC component. With a load connected, the secondary current would be the same as shown in FIG. 5(e) but it would be riding on a DC component which is equal to the load current. The switching driver 46 is operated in a push-pull arrangement so as to obtain a plus polarity or minus polarity in either direction. In other words, the switching driver can source power to the load or sink power from the load, both plus and minus (i.e., four quadrant dynamic converter).

From the foregoing detailed description, it can thus be seen that the present invention provides a metallic channel unit network which can be used by substantially all of the various alarm companies for connecting their equipment from location to location. The metallic channel unit network of the present invention provides an apparent metallic cable pair in almost every respect in the frequency range of DC to 3.5 KHz with an amplitude variation between +200 to −200 VDC.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A metallic channel unit network for interconnecting a two-wire, bidirectional signal transmitting means and a four-wire digital signal transmitting means in a communication, said metallic channel unit network comprising:

a two-wire port having tip and ring terminals adapted for connection to said two-wire means;

a signal receive port adapted for connection to a first signal transmission path of said four-wire means for receiving incoming tip and ring terminal DC to 300 Hz ("DC band") frequency signals and incoming tip and ring terminal "300 Hz to 3.5 KHz ("voice band") frequency signals;

a signal transmit port adapted for connection to a second signal transmission path of said four-wire means for supplying outgoing tip and ring terminal DC to 300 Hz ("DC band") frequency signals and outgoing tip and ring 300 Hz to 3.5 KHz (voice band) frequency signals from said two-wire means;

first circuit means including CODEC means coupled to said four-wire means for supplying said incoming tip and ring terminal "voice band" frequency signals of said four-wire means at a first node connected to said CODEC means;

second circuit means including D/A signal processing means and A/D signal processing means coupled to said four-wire means for supplying said incoming tip and ring terminal "DC band" frequency signals of said four-wire means at a second and third nodes connected to said D/A signal processing means;

voice hybrid driver means being responsive to said incoming tip and ring terminal "voice band" frequency signals of said four-wire means at the first node from said CODEC means for applying to said respective tip and ring terminals corresponding outgoing tip and ring terminal "voice band" frequency signals;

said voice hybrid driver means including line amplifier means having its inputs coupled across said incoming differential "voice band" frequency signals from said two-wire means for generating an output voltage on its output;

said CODEC means of said first circuit means being responsive to the output voltage of said line amplifier means at a first node for supplying said outgoing tip and ring terminal "voice band" frequency signals of said two-wire means for transmission over the second path of said four-wire means;

tip driver means having its input being responsive to said incoming tip terminal "DC band" frequency signals of said four-wire means arriving at the second node from said D/A signal processing means for applying to said tip terminal corresponding outgoing tip terminal "DC band" frequency signal and an output;

a first low output impedance coupled between the output of said tip driver means and said tip terminal so as to effect a low signalling capacitance;

ring driver means having its input being responsive to said incoming ring terminal "DC band" frequency signals of said four-wire means arriving at the third node from said D/A signal processing means for applying to said ring terminal corresponding outgoing ring terminal "DC band" frequency signal and an output;

a second low output impedance coupled between the output of said ring driver means and said ring terminal so as to effect a low signalling capacitance;

tip sensing amplifier having its non-inverting input coupled to the output of said tip driver means via said first low output impedance and being responsive to incoming tip terminal "DC band" frequency signals from said two-wire means for generating a higher tip input impedance, an inverting input, and an output;

ring sensing amplifier having its non-inverting input coupled to the output of said ring driver means via said second low output impedance and being responsive to incoming ring terminal "DC band" frequency signals from said two-wire means for generating a higher ring input impedance, an inverting input, and an output;

said A/D signal processing means being coupled to the output of said tip sensing amplifier at a fifth node for supplying said incoming tip terminal "DC band" frequency signals of said two-wire means for transmission over the second path of said four-wire means;

said A/D signal processing means being coupled to the output of said ring sensing amplifier at a sixth node for supplying said incoming ring terminal "DC band" frequency signals of said two-wire means for transmission over the second path of said four-wire means;

DC tip balance means coupled between the input of said tip driver means and the inverting input of said tip sensing amplifier for reducing an effective signalling capacitance; and DC ring balance means coupled between the input of said ring driver means and the inverting input of said ring sensing amplifier for reducing the effective signalling capacitance.

2. A metallic channel unit network as claimed in claim 1, further comprising autozero and autogain means interconnected between said D/A signal processing means and said A/D signal processing means for automatically correcting errors occurring in the D/A conversion process of said D/A signal processing means.

3. A metallic channel unit network as claimed in claim 1, wherein each of said tip and ring driver means is a switching driver which is comprised of driver amplifier means having an input and an output, driver polarity and rectifier means having its input coupled to the output of said driver amplifier means and an output, driver flip-flop means having an input and an output, power FET driver means having its input coupled to the output of said driver flip-flop means, feed forward compensation amplifier means coupled also to the output of said driver amplifier means for bypassing said power FET driver means at high frequencies, driver output current means for sensing the output impedance and having its output coupled to the input of said driver amplifier, comparator means coupled between the output of said rectifier means and the input of said flip-flop driver means, and a plurality of field-effect transistors being driven by said power FET driver means.

4. A metallic channel unit network as claimed in claim 3, wherein said driver amplifier means is formed of a transconductance amplifier whose output is connected to the input of said driver polarity and rectifier means for generating a slowly varying control signal, said comparator means having an inverting input being connected to receive said control signal and a non-inverting input being connected to receive a triangular waveform having a frequency of 32 KHz, and an output for generating a 32 KHz squarewave whose duty cycle is proportional to the control signal.

5. A metallic channel unit network as claimed in claim 4, further comprising duty cycle clamping means coupled to said comparator means for limiting the duty cycle of the squarewave to less than 50%.

6. A metallic channel unit network as claimed in claim 5, further comprising current trip detector means coupled to said plurality of field-effect transistors for limiting their current flow.

7. A metallic channel unit network as claimed in claim 1, wherein said A/D signal processing means include an A/D converter and an A/D ripple injector circuit for applying a 187 KHz squarewave to said A/D converter so as to provide a finer resolution.

8. A metallic channel unit network as claimed in claim 7, wherein said D/A signal processing means includes a D/A converter and a D/A canceling circuit coupled to said D/A converter for canceling the data error caused by said D/A ripple injection circuit.

9. A metallic channel unit network as claimed in claim 1, further comprising gate array means being coupled to said CODEC means, D/A signal processing means, and A/D signal processing means for generating a framing scheme which includes counter means whose output states determine the information to be transmitted, said counter means being updated every 6th frame so that a sync bit is sent every 12th frame, said sync bits forming a complete sync pattern and having a sequence of 0011.

10. A metallic channel unit network for interconnecting a two-wire, bidirectional signal transmitting means and a four-wire signal transmitting means in a communication, said metallic channel unit network comprising:

a two-wire port having tip and ring terminals adapted for connection to said two-wire means;

a signal receive-in port adapted for connection to a first signal transmission path of said four-wire means for receiving incoming tip and ring "DC band" frequency signals;

a signal transmit-out port adapted for connection to a second signal transmission path of said four-wire means for supplying outgoing tip and ring terminal "DC band" frequency signals thereto;

circuit means including A/D signal processing means and D/A signal processing means coupled to said four-wire means for supplying said incoming tip and ring terminal "DC band" frequency signal at first and second nodes connected to said D/A signal processing means;

tip driver means having its input being responsive to said incoming tip terminal "DC band" frequency signal arriving at the first node from said D/A signal processing means for applying to said tip terminal corresponding outgoing tip terminal "DC band" frequency signal and an output;

a first low output impedance coupled between the output of said tip driver means and said tip terminal so as to effect a low signalling capacitance;

ring driver means having its input being responsive to said incoming ring terminal "DC band" frequency signal arriving at the second node from said D/A signal processing means for applying to said ring terminal corresponding outgoing ring terminal "DC band" frequency signal and an output;

a second low output impedance coupled between the output of said ring driver means and said ring terminal so as to effect a low signalling capacitance;

tip sensing amplifier having its non-inverting input coupled to the output of said tip driver means via said first low output impedance and being responsive to incoming tip terminal "DC band" frequency signals from said two-wire means for generating a higher tip input impedance, an inverting input, and an output;

ring sensing amplifier having its non-inverting input coupled to the output of said ring driver means via said second low output impedance and being responsive to incoming ring terminal "DC band" frequency signals from said two-wire means for generating a higher ring input impedance, an inverting input, and an output;

said A/D signal processing means being coupled to the output of said tip sensing amplifier at a third node for supplying said incoming tip terminal "DC band" frequency signal of said two-wire means for transmission over the second path of said four-wire means;

said A/D signal processing means being coupled to the output of said ring sensing amplifier at a fourth node for supplying said incoming ring terminal "DC band" frequency signals of said two-wire means for transmission over the second path of said four-wire means;

DC tip balance means coupled between the input of said tip driver means and the inverting input of said tip sensing amplifier for reducing an effective signalling capacitance; and DC ring balance means coupled between the input of said ring driver means and the inverting input of said ring sensing amplifier for reducing the effective signalling capacitance.

11. A metallic channel unit network as claimed in claim 10, further comprising autozero and autogain means interconnected between said D/A signal processing means and said A/D signal processing means for automatically correcting errors occurring in the D/A converting process of said D/A signal processing means.

12. A metallic channel unit network as claimed in claim 10, wherein each of said tip and ring driver means is a switching driver which is comprised of driver amplifier means having an input and an output, driver polarity and rectifier means having an input coupled to the output of said driver amplifier means and an output, driver flip-flop means having an input and an output, power FET driver means having its input coupled to the output of said driver flip-flop means, feed forward compensation amplifier means coupled also to the output of said driver amplifier means for bypassing said power FET driver means at high frequencies, driver output current means for sensing the output impedance and having its output coupled to the input of said driver amplifier, comparator means coupled between the output of said rectifier means and the input of said flip-flop driver means, and a plurality of field-effect transistors being driven by said power FET driver means.

13. A metallic channel unit network as claimed in claim 12, wherein said driver amplifier means is formed of a transconductance amplifier whose output is connected to the input of said driver polarity and rectifier means for generating a slowly varying control signal, said comparator means having an inverting input being connected to receive said control signal and a non-inverting input being connected to receive a triangular waveform having a frequency of 32 KHz, and an output for generating a 32 KHz squarewave whose duty cycle is proportional to the control signal.

14. A metallic channel unit network as claimed in claim 13, further comprising duty cycle clamping means coupled to said comparator means for limiting the duty cycle of the squarewave to less than 50%.

15. A metallic channel unit network as claimed in claim 14, further comprising current trip detector means coupled to said plurality of field-effect transistors for limiting their current flow.

16. A metallic channel unit network for interconnecting a two-wire, bidirectional signal transmitting means and a four-wire signal transmitting means in a communication, said metallic channel unit network comprising:

a two-wire port having tip and ring terminals adapted for connection to said two-wire means;

a signal receive-in port adapted for connection to a first signal transmission path of said four-wire means for receiving incoming tip and ring "DC band" frequency signals;

a signal transmit-out port adapted for connection to a second signal transmission path of said four-wire means for supplying outgoing tip and ring terminal "DC band" frequency signals thereto;

circuit means including A/D signal processing means and D/A signal processing means coupled to said four-wire means for supplying said incoming tip and ring terminal "DC band" frequency signal at a first node connected to said D/A signal processing means;

tip or ring driver means having its input being responsive to said incoming tip or ring terminal "DC band" frequency signals arriving at the first node from said D/A signal processing means for applying to said tip or ring terminal corresponding outgoing tip or ring terminal "DC band" frequency signal and an output;

low output impedance coupled between the output of said tip or ring driver means and said tip or ring terminal so as to effect a low signalling capacitance;

tip or ring driver means having its non-inverting input coupled to said tip or ring driver means via said low output impedance and being responsive to said incoming tip or ring "DC band" frequency signals from said two-wire transmission for generating a higher tip or ring input impedance an inverting input, and an output;

said A/D signal processing means being coupled to the output of said ring sensing amplifier at a second node for supplying said incoming tip or ring terminal "DC band" frequency signals of said two-wire means for transmission over the second path of said four-wire means; and DC tip or ring balance means coupled between the input of said tip or ring driver means and the inverting input of said tip or ring sensing amplifier for reducing an effective signalling capacitance.

17. A metallic channel unit network as claimed in claim 16, further comprising autozero and autogain means interconnected between said D/A signal processing means and said A/D signal processing means for automatically correcting errors occurring in the D/A converting process of said D/A signal processing means.

18. A metallic channel unit network as claimed in claim 16, wherein each of said tip and ring driver means is a switching driver which is comprised of driver amplifier means having an input and an output, driver polarity and rectifier means having its input coupled to the output of said driver amplifier means and an output, driver flip-flop means having an input and an output, power FET driver means having its input coupled to the output of said driver flip-flop means, feed forward compensation amplifier means coupled also to the output of said driver amplifier means for bypassing said power FET driver means at high frequencies, driver output current means for sensing the output impedance and having its output coupled to the input of said driver amplifier, comparator means coupled between the output of said rectifier means and the input of said flip-flop driver means, and a plurality of field-effect transistors being driven by said power FET driver means.

* * * * *